United States Patent
Franke et al.

(10) Patent No.: US 9,054,913 B1
(45) Date of Patent: *Jun. 9, 2015

(54) NETWORK PROTOCOL PROXY

(75) Inventors: Michael Franke, Trabuco Canyon, CA (US); Michael McDonald, Herndon, VA (US)

(73) Assignee: Dell Software Inc., Aliso Viejo, CA (US)

( * ) Notice: Subject to any disclaimer, the term of this patent is extended or adjusted under 35 U.S.C. 154(b) by 518 days.

This patent is subject to a terminal disclaimer.

(21) Appl. No.: 12/955,785

(22) Filed: Nov. 29, 2010

Related U.S. Application Data

(60) Provisional application No. 61/265,298, filed on Nov. 30, 2009.

(51) Int. Cl.
*G06F 15/173* (2006.01)
*H04L 29/06* (2006.01)

(52) U.S. Cl.
CPC ............................... *H04L 29/06285* (2013.01)

(58) Field of Classification Search
USPC .......... 709/224, 232–235, 227, 228; 370/229, 370/230, 252, 253
See application file for complete search history.

(56) References Cited

U.S. PATENT DOCUMENTS

| | | | |
|---|---|---|---|
| 6,151,632 A | 11/2000 | Chaddha et al. | |
| 6,157,944 A | 12/2000 | Pedersen | |
| 6,185,208 B1 * | 2/2001 | Liao | 370/392 |
| 6,609,159 B1 * | 8/2003 | Dukach et al. | 719/331 |
| 6,643,690 B2 | 11/2003 | Duursma et al. | |
| 6,687,227 B1 | 2/2004 | Li et al. | |
| 6,766,333 B1 | 7/2004 | Wu et al. | |
| 6,785,726 B1 | 8/2004 | Freeman et al. | |
| 6,789,112 B1 | 9/2004 | Freeman et al. | |
| 6,807,580 B2 | 10/2004 | Freeman et al. | |
| 6,826,606 B2 | 11/2004 | Freeman et al. | |
| 6,928,469 B1 | 8/2005 | Duursma et al. | |
| 6,961,349 B2 | 11/2005 | Malomsoky et al. | |
| 6,986,040 B1 | 1/2006 | Kramer et al. | |
| 7,007,092 B2 | 2/2006 | Peiffer | |
| 7,051,084 B1 | 5/2006 | Hayton et al. | |
| 7,100,200 B2 | 8/2006 | Pope et al. | |
| 7,194,743 B2 | 3/2007 | Hayton et al. | |

(Continued)

FOREIGN PATENT DOCUMENTS

| | | |
|---|---|---|
| WO | WO 2005/013534 | 2/2005 |
| WO | WO 2008/076022 | 6/2008 |
| WO | WO 2008/112774 | 9/2008 |

OTHER PUBLICATIONS

Leigh et al, "Adaptive Networking for Tele-Immersion" Electronic Visualization Laboratory (EVL), University of Illinois at Chicago, + spiff@evl.uic.edu, pp. 1-10.

(Continued)

*Primary Examiner* — Joon H Hwang
*Assistant Examiner* — Cheikh Ndiaye
(74) *Attorney, Agent, or Firm* — Winstead PC

(57) ABSTRACT

A network proxy can be provided as a layer between an application layer protocol (such as the Remote Desktop Protocol) and a transport layer protocol (such as TCP). The network proxy can intercept communications between the application layer protocol and the transport layer protocol. The network proxy can transmit communications on multiple connections, without the application layer or transport layer protocols being aware of the parallelization.

22 Claims, 16 Drawing Sheets

(56) References Cited

U.S. PATENT DOCUMENTS

| | | |
|---|---|---|
| 7,286,476 B2 | 10/2007 | Helmy et al. |
| 7,290,061 B2 | 10/2007 | Lentini et al. |
| 7,328,267 B1 | 2/2008 | Bashyam et al. |
| 7,340,772 B2 | 3/2008 | Panasyuk et al. |
| 7,346,842 B1 | 3/2008 | Hayton et al. |
| 7,376,695 B2 | 5/2008 | Duursma et al. |
| 7,453,379 B2 | 11/2008 | Plamondon |
| 7,460,038 B2 | 12/2008 | Samuels et al. |
| 7,483,434 B2 | 1/2009 | Biran et al. |
| 7,493,383 B1 | 2/2009 | Mukerji |
| 7,496,097 B2 | 2/2009 | Rao et al. |
| 7,502,726 B2 | 3/2009 | Panasyuk et al. |
| 7,532,134 B2 | 5/2009 | Samuels et al. |
| 7,542,471 B2 | 6/2009 | Samuels et al. |
| 7,543,072 B1 | 6/2009 | Hertzog et al. |
| 7,562,146 B2 | 7/2009 | Panasyuk et al. |
| 7,581,005 B2 | 8/2009 | Montemayor et al. |
| 7,584,294 B2 | 9/2009 | Plamondon |
| 7,606,902 B2 | 10/2009 | Rao et al. |
| 7,609,721 B2 | 10/2009 | Rao et al. |
| 7,613,131 B2 | 11/2009 | Decasper et al. |
| 7,616,644 B2 | 11/2009 | Chaskar et al. |
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,664,857 B2 | 2/2010 | Ovsiannikov et al. |
| 7,680,885 B2 | 3/2010 | Schauser et al. |
| 7,685,298 B2 | 3/2010 | Day et al. |
| 7,685,630 B2 | 3/2010 | Thapliyal et al. |
| 7,706,266 B2 | 4/2010 | Plamondon |
| 7,711,835 B2 | 5/2010 | Braddy et al. |
| 7,712,110 B2 | 5/2010 | Gulkis |
| 7,720,936 B2 | 5/2010 | Plamondon |
| 7,720,954 B2 | 5/2010 | Raja et al. |
| 7,724,657 B2 | 5/2010 | Rao et al. |
| 7,734,777 B2 | 6/2010 | Raja et al. |
| 7,748,032 B2 | 6/2010 | Simmons |
| 7,756,826 B2 | 7/2010 | Bots et al. |
| 7,756,984 B2 | 7/2010 | Burr et al. |
| 7,757,074 B2 | 7/2010 | Sundarrajan et al. |
| 7,760,642 B2 | 7/2010 | Plamondon |
| 7,760,729 B2 | 7/2010 | Srisuresh et al. |
| 7,769,869 B2 | 8/2010 | Venkatraman et al. |
| 7,774,492 B2 | 8/2010 | Raphel et al. |
| 7,779,034 B2 | 8/2010 | Pedersen et al. |
| 7,783,757 B2 | 8/2010 | Plamondon |
| 7,783,985 B2 | 8/2010 | Indiran et al. |
| 7,796,510 B2 | 9/2010 | Plamondon |
| 7,797,724 B2 | 9/2010 | Calvin |
| 7,801,978 B1 | 9/2010 | Susai et al. |
| 7,808,906 B2 | 10/2010 | Rao et al. |
| 7,809,818 B2 | 10/2010 | Plamondon |
| 7,810,089 B2 | 10/2010 | Sundarrajan et al. |
| 7,827,139 B2 | 11/2010 | Schauser et al. |
| 7,827,237 B2 | 11/2010 | Plamondon |
| 7,843,912 B2 | 11/2010 | Harris et al. |
| 7,849,269 B2 | 12/2010 | Sundarrajan et al. |
| 7,849,270 B2 | 12/2010 | Sundarrajan et al. |
| 7,853,678 B2 | 12/2010 | Khemani et al. |
| 7,853,679 B2 | 12/2010 | Khemani et al. |
| 7,865,585 B2 | 1/2011 | Samuels et al. |
| 7,865,589 B2 | 1/2011 | Khemani et al. |
| 7,865,603 B2 | 1/2011 | Braddy et al. |
| 7,870,153 B2 | 1/2011 | Croft et al. |
| 7,870,277 B2 | 1/2011 | Korrapati et al. |
| 7,870,294 B2 | 1/2011 | Braddy et al. |
| 7,872,597 B2 | 1/2011 | Samuels et al. |
| 7,873,965 B2 | 1/2011 | Hayton et al. |
| 7,876,712 B2 | 1/2011 | Decasper et al. |
| 7,877,463 B2 | 1/2011 | Lentini et al. |
| 7,886,050 B2 | 2/2011 | Raja et al. |
| 7,890,570 B2 | 2/2011 | Mazzaferri |
| 7,900,240 B2 | 3/2011 | Terzis et al. |
| 7,907,621 B2 | 3/2011 | Mullick et al. |
| 7,916,047 B2 | 3/2011 | Samuels et al. |
| 7,921,184 B2 | 4/2011 | Sundarrajan et al. |
| 7,924,884 B2 | 4/2011 | Kailash et al. |
| 7,925,694 B2 | 4/2011 | Harris |
| 7,926,116 B2 | 4/2011 | Kamath et al. |
| 7,949,677 B2 | 5/2011 | Croft et al. |
| 7,953,889 B2 | 5/2011 | Suganthi et al. |
| 7,954,150 B2 | 5/2011 | Croft et al. |
| 7,966,524 B2 | 6/2011 | Hayton |
| 7,969,876 B2 | 6/2011 | Samuels et al. |
| 7,970,923 B2 | 6/2011 | Pedersen et al. |
| 7,978,617 B2 | 7/2011 | Von Eicken et al. |
| 7,978,714 B2 | 7/2011 | Rao et al. |
| 7,978,716 B2 | 7/2011 | Rao et al. |
| 7,984,157 B2 | 7/2011 | Panasyuk et al. |
| 7,984,192 B2 | 7/2011 | Burr et al. |
| 8,004,973 B2 | 8/2011 | Budhani et al. |
| 8,009,682 B2 | 8/2011 | Gopinath et al. |
| 8,010,679 B2 | 8/2011 | Low et al. |
| 8,014,421 B2 | 9/2011 | Rao et al. |
| 8,018,961 B2 | 9/2011 | Gopinath et al. |
| 8,019,868 B2 | 9/2011 | Rao et al. |
| 8,020,195 B2 | 9/2011 | Frost et al. |
| 8,112,539 B2 | 2/2012 | Mahdavi |
| 2002/0055980 A1 | 5/2002 | Goddard |
| 2002/0055982 A1 | 5/2002 | Goddard |
| 2002/0055983 A1* | 5/2002 | Goddard ........................ 709/217 |
| 2002/0065922 A1 | 5/2002 | Shastri |
| 2002/0196760 A1 | 12/2002 | Malomsoky et al. |
| 2003/0163569 A1 | 8/2003 | Panasyuk et al. |
| 2003/0191841 A1 | 10/2003 | DeFerranti et al. |
| 2004/0064577 A1 | 4/2004 | Dahlin et al. |
| 2005/0025150 A1* | 2/2005 | Helmy et al. ................. 370/392 |
| 2005/0198379 A1 | 9/2005 | Panasyuk et al. |
| 2005/0198380 A1 | 9/2005 | Panasyuk et al. |
| 2005/0246445 A1 | 11/2005 | Panasyuk et al. |
| 2005/0256923 A1 | 11/2005 | Adachi |
| 2005/0267974 A1 | 12/2005 | Panasyuk et al. |
| 2005/0273513 A1 | 12/2005 | Panasyuk et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047824 A1 | 3/2006 | Bowler |
| 2006/0047956 A1 | 3/2006 | Calvin |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075463 A1 | 4/2006 | Braddy et al. |
| 2006/0089996 A1 | 4/2006 | Peiffer |
| 2006/0095334 A1 | 5/2006 | Simmons |
| 2006/0101144 A1 | 5/2006 | Wiryaman et al. |
| 2006/0159080 A1 | 7/2006 | Mazzaferri |
| 2006/0159432 A1 | 7/2006 | Mazzaferri |
| 2006/0161555 A1 | 7/2006 | Mazzaferri |
| 2006/0161671 A1 | 7/2006 | Ryman |
| 2006/0161959 A1 | 7/2006 | Ryman |
| 2006/0190719 A1 | 8/2006 | Rao |
| 2006/0235939 A1* | 10/2006 | Yim .............................. 709/217 |
| 2007/0088826 A1 | 4/2007 | Raphel et al. |
| 2007/0094672 A1 | 4/2007 | Hayton et al. |
| 2007/0100976 A1 | 5/2007 | Aboukarr et al. |
| 2007/0130167 A1 | 6/2007 | Day et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |

(56) References Cited

U.S. PATENT DOCUMENTS

| | | | |
|---|---|---|---|
| 2007/0180493 | A1 | 8/2007 | Croft et al. |
| 2007/0186212 | A1 | 8/2007 | Mazzaferri et al. |
| 2007/0192329 | A1 | 8/2007 | Croft et al. |
| 2007/0198656 | A1 | 8/2007 | Mazzaferri et al. |
| 2007/0226375 | A1 | 9/2007 | Chu et al. |
| 2007/0239886 | A1 | 10/2007 | Montemayor et al. |
| 2007/0280277 | A1 | 12/2007 | Lund |
| 2008/0031235 | A1 | 2/2008 | Harris et al. |
| 2008/0034057 | A1 | 2/2008 | Kumar et al. |
| 2008/0034072 | A1 | 2/2008 | He et al. |
| 2008/0034110 | A1 | 2/2008 | Suganthi et al. |
| 2008/0034111 | A1 | 2/2008 | Kamath et al. |
| 2008/0034119 | A1 | 2/2008 | Verzunov et al. |
| 2008/0034410 | A1 | 2/2008 | Udupa et al. |
| 2008/0034413 | A1 | 2/2008 | He et al. |
| 2008/0034418 | A1 | 2/2008 | Venkatraman et al. |
| 2008/0034419 | A1 | 2/2008 | Mullick et al. |
| 2008/0043617 | A1 | 2/2008 | Schekochikhin et al. |
| 2008/0043622 | A1 | 2/2008 | Kamath et al. |
| 2008/0043749 | A1 | 2/2008 | Suganthi et al. |
| 2008/0043760 | A1 | 2/2008 | Venkatraman et al. |
| 2008/0043761 | A1 | 2/2008 | Kumar et al. |
| 2008/0046371 | A1 | 2/2008 | He et al. |
| 2008/0046616 | A1 | 2/2008 | Verzunov et al. |
| 2008/0046714 | A1 | 2/2008 | Suganthi et al. |
| 2008/0046717 | A1 | 2/2008 | Kanekar et al. |
| 2008/0046727 | A1 | 2/2008 | Kanekar et al. |
| 2008/0046994 | A1 | 2/2008 | Venkatraman et al. |
| 2008/0049616 | A1 | 2/2008 | Kamath et al. |
| 2008/0084826 | A1 | 4/2008 | Ong |
| 2008/0134258 | A1 | 6/2008 | Goose et al. |
| 2008/0208605 | A1 | 8/2008 | Sinha et al. |
| 2008/0225728 | A1 | 9/2008 | Plamondon |
| 2009/0019226 | A1 | 1/2009 | Edwards et al. |
| 2009/0106347 | A1 | 4/2009 | Harwood et al. |
| 2009/0182846 | A1 | 7/2009 | Bowler |
| 2009/0187654 | A1 | 7/2009 | Raja et al. |
| 2009/0234972 | A1 | 9/2009 | Raghu et al. |
| 2010/0142413 | A1 | 6/2010 | Eriksson et al. |
| 2010/0220588 | A1 | 9/2010 | Plamondon et al. |
| 2010/0312899 | A1 | 12/2010 | Herzog et al. |
| 2010/0325697 | A1 | 12/2010 | Terzis et al. |
| 2010/0332667 | A1 | 12/2010 | Menchaca et al. |
| 2011/0125892 | A1 | 5/2011 | Rajan et al. |
| 2011/0145819 | A1 | 6/2011 | Mckenzie et al. |
| 2012/0151088 | A1 | 6/2012 | Weston et al. |
| 2013/0151719 | A1 | 6/2013 | Herzog et al. |

OTHER PUBLICATIONS

Alrshah, et al. Comparative Study of Single-Based TCP and Parallel TCP in Heterogeneous Networks. Journal of Theoretical and Applied Information Technology, pp. 77-81.

Kurose et al., Transport Layer from the Computer Networking: A Top-Down Approach Book, 4$^{th}$ Edition: 2000, pp. 290.

"Desktop Virtualization: Wise Technology", by Suneet, Aug. 1, 2010; http://techtalk4you/desktop-virtualization/desktop-virtualization-wyse-technologies/.

Brian Madden, Quest's EOP "Xtreme" Does Amazing Things for RPD Latency (with Video Demo Goodness), Jul. 12, 2010; 3 pages.

Martin Wicket "Extending Microsoft's Terminal Services Client to Provide Seamless Windows," Apr. 14, 2005; 8 pages, http://www.codeproject.com/KB/IP/tswindowclipper.aspx.

Hacker et al., "Improving Throughput and Maintaining Fairness using Parallel TCP," INFOCOM 2004, Jul. 7, 2004; 10 pages.

Natarajan et al., "Multiple TCP Connections Improve HTTP Throughput—Myth or Fact?" Research funded by Sisco Systems Inc., 12 pages.

"PC-over-IP® WAN Optimization—Overview", Teradici Corporation, 2 pages. www.teradici.com.

Sivakumar et al., "PSockets: The Case for Application-level Network Striping for Data Intensive Applications using High Speed Wide Area Networks", 2000, 6 pages.

"Remote Desktop Protocol", dated Oct. 6, 2010; http://en.wikipedia.org/wiki/Remote_Desktop_Protocol.

"Remote Desktop Services Virtual Channels", dated Sep. 23, 2010; http://msdn.microsoft.com/en-us/library/aa383509(VS.85, printer).aspx.

Jacobson, et al., "TCP Extensions for High Performance", Network Working Group, Request for comments: 1323, dated May 1992; pp. 1-38. http://toolslietf.org/html/rfc1323.

"Network Acceleration", Data Center Class WAN Optimization, Silver Peak, 1 page, http://www.silver-peak.com/Technology/Network_Acceleration.htm.

"TCP Congestion Avoidance Algorithm", 4 pages. http://en.wikipedia.org/wiki/TCP_congestion_Avoidance_algorithm.

"TCP Sockets", retrieved Oct. 28, 2010; 6 pages. http://www.scs.villanova.edu/~mdamian/Sockets/TcpSockets.htm.

Yunhong Gu, "Breaking the Data Transfer Bottleneck UDT: A High Performance Data Transport Protocol", dated Oct. 10, 2005; updated Aug. 8, 2009; 50 pages. udt.souceforge.net.

"Using Remote Desktop Services Virtual Channels", Sep. 23, 2010; 1 page, http://msdn.microsoft.com/en-us/library/aa383546(VS,85,printer).aspx.

WMware Communities:PCoIP vs ICA vs RDP, retrieved Nov. 22, 2010; 2 pages. http://communities.vmware.com/thread/261071.

WMware:VMwareView-Point Blog: "Why PCoIp is Ideal for Remote Virtual Desktops", Oct. 14, 2009; 2 pages, VMware View-Point Blog (http://blogs.vmware.com/view-point/2009/10/why-pcoip-is-the-best-prot . . . .

"Wyse Thin computing Software", Wise Technology Inc., 34 pages, http://www.wyse.com.

"Your guide to the Wyse virtual Desktop Accelerator (VDA)", 2 pages, www.wyse.co.uk.

Hsieh, Hung-Yun, et al., "A Transport Layer Approach for Achieving Aggregate Bandwidths on Multi-Homed Mobile Hosts," Wireless Networks Nov. 1-2, 2005, 16 pages.

Hsieh, Hung-Yun, et al., "A Transport Layer Approach for Achieving Aggregate Bandwidths on Multi-homed Mobile Hosts," ACM, Sep. 23-26, 2002, 12 pages.

Dong, Yu, et al., "Multi-Path Load Balancing in Transport Layer," Next Generation Internet Networks, 3rd EuroNGI Conference on IEEE, 2007, 8 pages.

Abd El Al, Ahmed, et al., "LS-SCTP: A Bandwidth Aggregation Technique for Stream Control Transmission Protocol," Computer Communications 27.10, 2004, 13 pages.

* cited by examiner

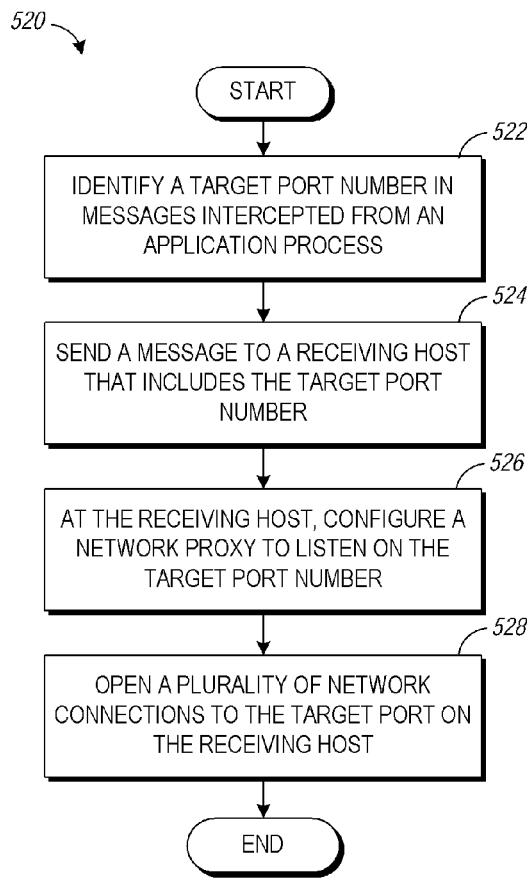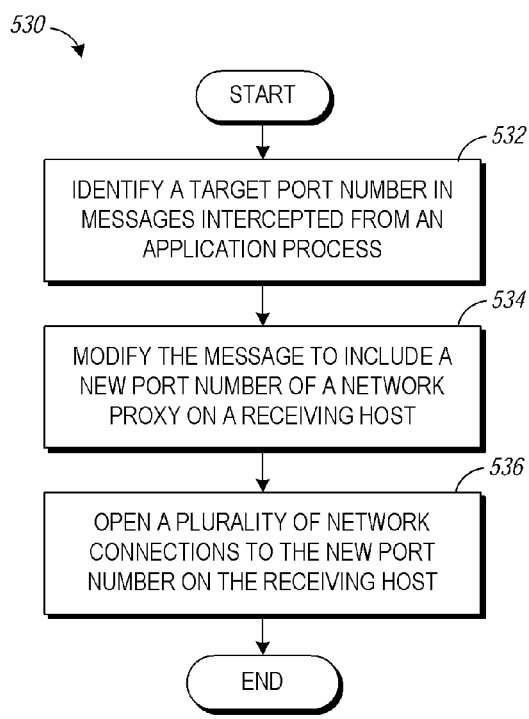
FIG. 5B
FIG. 5C

NETWORK PROTOCOL PROXY

RELATED APPLICATION

This application claims the benefit of priority under 35 U.S.C. §119(e) of U.S. Provisional Patent Application No. 61/265,298, filed on Nov. 30, 2009, entitled "Parallel Communication Proxy Having Efficient Bandwidth Utilization," the disclosure of which is hereby incorporated by reference in its entirety.

BACKGROUND

TCP (Transmission Control Protocol) is a widely-used transport protocol for sending information over local area networks (LANs) and wide area networks (WANs), including the Internet. TCP provides reliable, ordered delivery of a stream of bytes from one computer system to another. Many applications rely on TCP, including web applications, email, and file transfer applications.

TCP provides mechanisms for controlling network congestion to reduce packet losses and to promote fair use of network resources. TCP's congestion control features include a slow-start mechanism, in which TCP slowly ramps up bandwidth usage when a TCP connection is initiated. TCP also employs an algorithm that reduces a connection's bandwidth consumption when TCP detects congestion. In the aggregate, when multiple hosts on a network ramp up bandwidth usage slowly and selectively throttle their bandwidth, congestion on that network is generally reduced. However, TCP's congestion control mechanisms can also adversely impact an individual application's performance.

SUMMARY

In certain embodiments, a network proxy acts is provided that acts as a layer between an application layer protocol (such as the Remote Desktop Protocol) and a transport layer protocol (such as TCP). The network proxy can intercept communications between the application layer protocol and the transport layer protocol. In some embodiments, the network proxy can transmit communications on multiple connections, without the application layer or transport layer protocols being aware of the parallelization.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIG. 5B illustrates an embodiment of a port relaying process.

FIG. 5C illustrates an embodiment of a port redirection process.

DETAILED DESCRIPTION

I. Introduction

Certain application layer network protocols do not efficiently use bandwidth on latent network connections. The inefficiency of such protocols can be exacerbated due to the congestion control properties of TCP described above. The Remote Desktop Protocol (RDP) is an example of a protocol that can exhibit poor performance in latent network connections over TCP. RDP can be implemented in Virtual Desktop Computing and WINDOWS Terminal Server environments to provide users with remote access to desktop applications. Latent RDP connections over TCP to such environments, however, can result in a degraded user experience, particularly for graphics-intensive applications.

The performance of application layer protocols such as RDP can be enhanced by compensating network communications for TCP's congestion-control mechanisms. One way to compensate for TCP congestion control is to provide parallel TCP connections between hosts. Using parallel connections instead of a single connection can at least partially circumvent TCP's congestion control mechanisms. As a result, throughput can be increased. In certain embodiments, these effects can provide benefits on any network, including both LANs and WANs. In certain embodiments, however, parallel TCP connections are particularly beneficial on higher latency networks, such as WANs that have a latency of about 30 ms or more.

Although parallel TCP connections can improve throughput, RDP and other application protocols are typically coded to access a standard TCP socket application programming interface (API). Modifying the source code of an application protocol such as RDP to use a new parallel TCP API would be difficult, if not impossible, since many application protocols are proprietary. Advantageously, in certain embodiments, a network proxy can be provided as a layer between a native application layer protocol and TCP. The network proxy can intercept communications between the native application layer protocol and TCP. The network proxy can transmit communications on multiple connections, without the native application layer or TCP being aware of the parallelization.

Although this disclosure is described primarily in the context of TCP, some or all of the features described herein can also be applied to other transport layer protocols or to other communication protocols.

II. Network Proxy Overview

Figure 1:
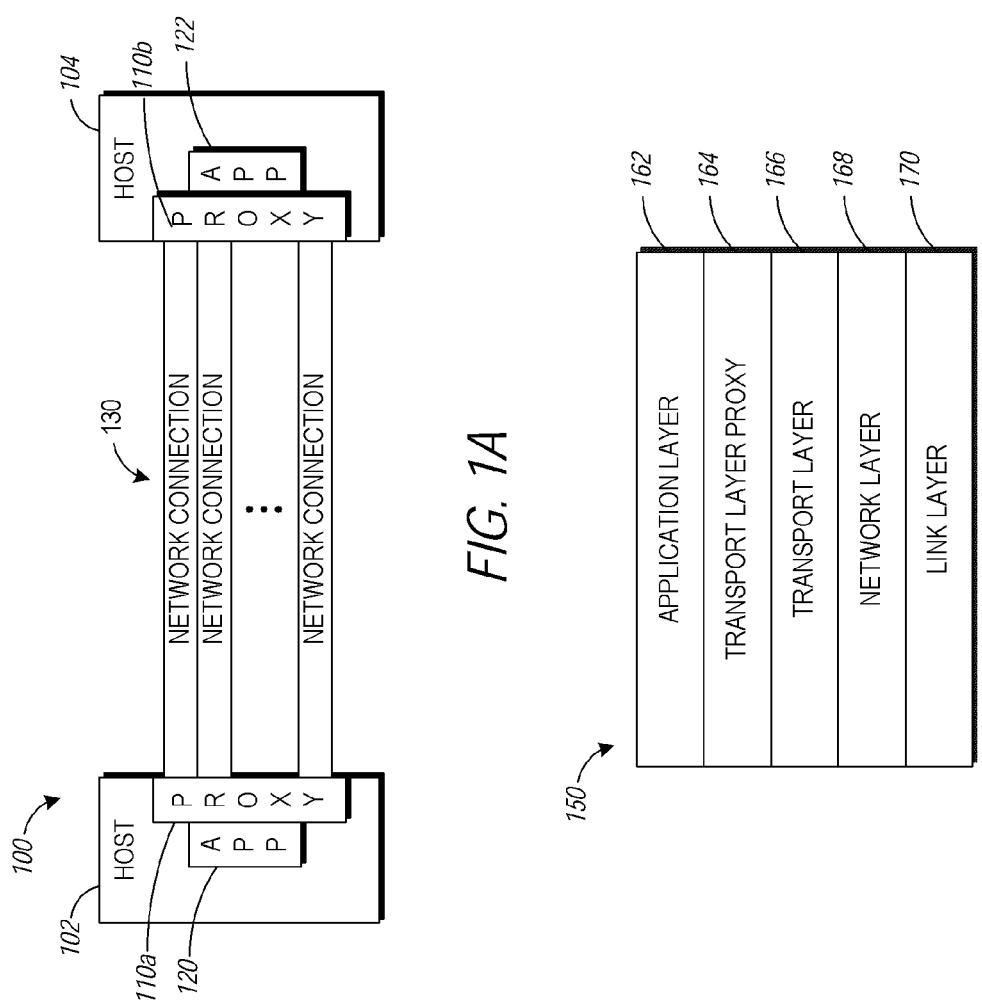
FIG. 1A illustrates an embodiment of a network proxy system.
FIG. 1B illustrates an embodiment of a transport layer proxy in the context of an example network protocol stack.

FIG. 1A depicts an embodiment of a network proxy system 100 that illustrates an overview of certain network proxy features. Two hosts 102, 104 are depicted in the network proxy system 100. The hosts 102, 104 can be physical computing devices, such as desktops, laptops, handheld devices, or the like. The hosts 102, 104 can represent endpoint devices on a network (not shown). For example, one of the hosts 102, 104 can be a client, while the other can be a server.

An application 120, 122 is installed on each host 102, 104. The application 120, 122 can implement an application layer network protocol such as RDP, HTTP, SMTP, FTP, various peer-to-peer protocols, or the like. The applications 120, 122 can but need not be the same type of application. For example, the application 120 can be a client application (such as a web browser) while the application 122 is a server application (such as a web server).

A network proxy 110a, 110b is interposed between each of the applications 120, 122 and a network. The network proxy 110a, 110b can be a software layer or service that overcomes at least some of the limitations of TCP or other protocols. In other embodiments, each of the network proxies 110a, 110b can be implemented on a hardware appliance in communication with the hosts 102, 104. When the application 120 on the host 102 attempts to connect to the application 122 on the second host 104, the network proxy 110a on the first host 102 can intercept the communication. The network proxy 110a can buffer the communication and open a plurality of network sessions or connections 130 to the second host. The network proxy 110a can distribute data in the communication over the multiple network connections 130. The number of connections 130 opened by the network proxy 110a can be user-defined or can be determined programmatically, as will be described in greater detail below (see FIGS. 12-14).

The second host 104 also includes a network proxy 110b that receives the application data over the network connections 130. The network proxy 110b on the second host 104 can reassemble the data from the multiple network connections 130 into a single stream of data and can provide this stream of data to the application 122. It should also be noted that the network proxy 110b can also send data over parallel network connections to the network proxy 110a, which can reassemble the data received over these connections. Each proxy 110a, 110b can therefore include both client and server functionality in certain embodiments.

Advantageously, in certain embodiments, the actions performed by the network proxies 110a, 110b can be transparent to the applications 120, 122 on each host 102, 104. From the point of view of the application 120, the application 120 calls an API to open a single connection with the application 122. Likewise, the application 122 receives data over what appears to be a single connection to the application 122. The network proxy 110a can intercept API calls and open multiple connections in place of the single connection while abstracting this activity from the applications 120. As a result, in certain embodiments, the network proxy 110a can be configured for use with any application without having to modify the source code of the application.

The network proxy 110 can parallelize network connections at any layer of a network stack. As an example, FIG. 1B depicts an example network stack 150 that includes an application layer 162, a transport layer 166, a network layer 168, and a link layer 170. A network proxy, depicted as a transport layer proxy 164, is interposed between the application layer 162 and the transport layer 166. In one illustrative embodiment, the application layer 162 implements an application layer protocol such as RDP, while the transport layer 166 implements a transport layer protocol such as TCP. The transport layer proxy 164 can therefore parallelize transport layer connections.

The transport layer proxy 164 can parallelize connections based on TCP or other transport layer protocols. For instance, in one embodiment, the transport layer proxy 164 can intercept a User Datagram Protocol (UDP) connection request and open parallel UDP connections. In another implementation, the transport layer proxy 164 can intercept a UDP connection request and instead open parallel TCP connections. Opening parallel TCP connections instead of a UDP connection can provide the reliability benefits of TCP while at least partially avoiding congestion control, thereby providing similar benefits to UDP. Similarly, the transport layer proxy 164 can intercept a TCP request and open parallel UDP connections instead.

In some embodiments, the network proxy 110 of FIG. 1A can parallelize connections between layers other than the application and transport layers. Further, the network stack 150 of FIG. 1B is merely an illustrative example and can be varied considerably to include fewer or additional layers. Other layers not shown but which may be part of a network stack include presentation layers, session layers, and a physical layer. In general, in various implementations, the network proxy 110 can transform any requested connection into multiple connections that represent transmission streams of data or the like.

Referring again to FIG. 1A, the network connections 130 are illustrated in parallel. The term "parallel," while having its ordinary meaning, is also used herein to refer to logical parallel connections and may, but need not imply parallel physical connections (such as parallel circuits). Thus, data transmitted over parallel connections may be, but need not be, transmitted on the network connections 130 simultaneously or substantially simultaneously. However, the network proxy 110 can cause at least some data to propagate over a network at the same time (see, e.g., FIGS. 8 and 9).

Further, it should be noted that if an application natively opens multiple TCP connections, the network proxy 110 can still open parallel connections corresponding for each of (or one or more of) the native TCP connections. If a web browser, for instance, opens a TCP connection for a web page and then a separate TCP connection for an object in the page (such as a video), the network proxy 110 can optionally open multiple connections for the video or even the web page itself. The application may be unaware of the multiple connections opened by the network proxy 110, as described above. In addition, the network proxy 110 can be used in conjunction with other network acceleration, compression, or encryption technology in certain embodiments.

While the network proxy 110 can increase application throughput, circumventing the congestion-control mechanism of TCP with additional connections 130 could cause a host 102, 104 to monopolize available bandwidth. In certain embodiments, the network proxy 110 therefore dynamically monitors bandwidth usage and makes periodic adjustments to attempt to ensure fair usage of network resources. The network proxy 110 can implement certain congestion control features, examples of which are described below with respect to FIGS. 10 and 11.

Moreover, adding more network connections 130 may not always effectively use available bandwidth. Some applications 120, 122 might benefit from more connections 130 than some applications. Merely increasing the number of connections 130 used may provide less than an optimal benefit for other applications. Advantageously, in certain embodiments, the network proxy 110 can dynamically adjust the number of network connections 130 made and/or the size of network buffers (e.g., TCP buffers) used to more effectively utilize bandwidth. Dynamic connection adjustment is described in greater detail below with respect to FIGS. 13 and 14. Many other example features of the network proxy 110 are also described in greater detail below.

Figure 2:
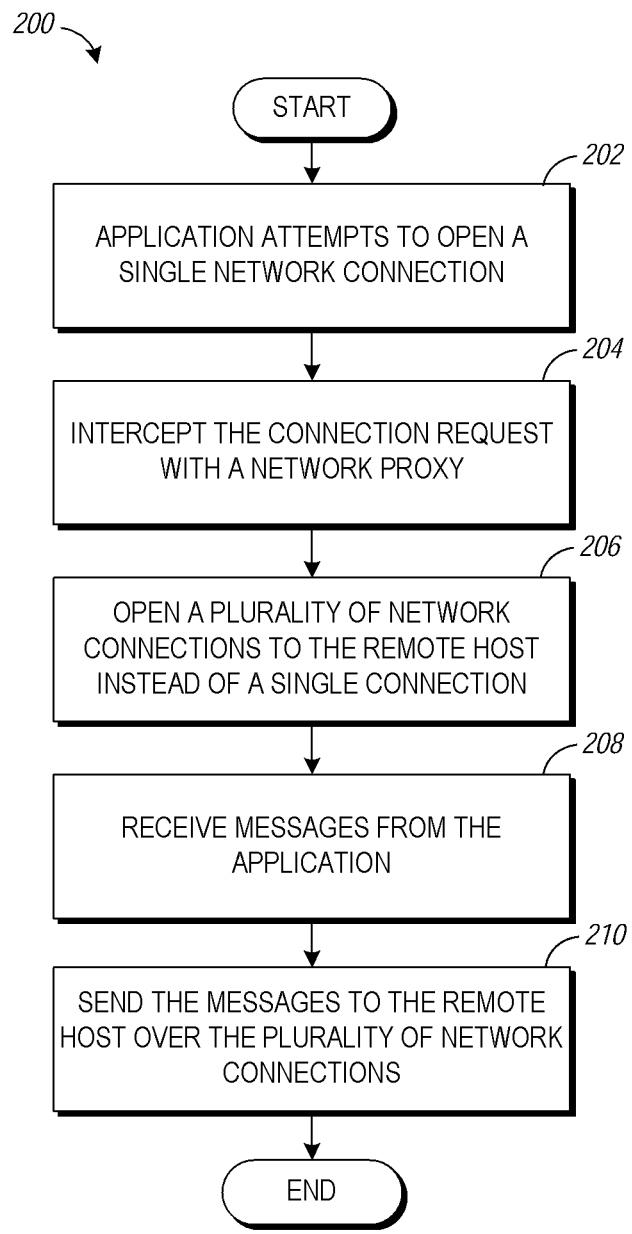
FIG. 2 illustrates an embodiment of a connection interception process.

FIG. 2 illustrates an embodiment of a connection interception process 200. The connection interception process 200 (other than block 202) can be implemented by the network proxy 110 or 164 described above. In the connection interception process 200, the network proxy 110, 164 can intercept communications from an application using any of a variety of techniques.

At block 202, an application attempts to open a single network connection. For instance, the application can attempt to open a TCP connection by making a socket API call. At block 204, the connection request is intercepted by a network proxy. The connection request can be intercepted in a variety of ways. One way to intercept the connection is by replacing a network-related shared library or dynamic-link library (DLL) used by the application with another library that performs different functions. The network proxy can be or can include the replacement library. Routines in the replacement library can have the same type signatures as the routines used in the replaced library (such as the same socket connect routine type signature) but different implementing code. Thus, the application code need not be modified to call the routines in the replacement library. In one embodiment, the replacement library replaces a network services library in an operating system, thereby intercepting network connection requests from any application running in the operating system.

Another approach to intercepting the connection request is to inject a monitoring library or DLL into the application process. This monitoring library can monitor connection request calls made by the application, trap these calls, and issue new calls in their place. The network proxy can be or can include this monitoring library. A third approach to intercepting the connection request is to register a filter library as a network provider with an operating system the application is running in. The network proxy can be or can include the filter library. By registering the filter library with the operating system, the filter library can receive network connection requests before they are sent to a normal network stack. Thus, routines in the filter library can receive the connection request from the application and open parallel network connections. In some implementations, the network proxy can implement any combination of these interception techniques to include a replacement library, a monitoring library, or a filter library, combinations of the same, or the like.

At block 206, a plurality of network connections is opened to the remote host by the network proxy instead of a single connection. As used herein, the term "remote host" and its derivatives, in addition to having their ordinary meaning, can refer to any host that is physically separate from another host, regardless of the physical distance separating the two hosts. One or more messages are received from the application at block 208, and these messages are sent by the network proxy to a remote host over the multiple connections at block 210.

The network proxy has been described primarily as component or set of components that intercepts network connection requests and opens multiple connections in their place. In addition to these features, the network proxy can intercept other types of calls made by an application and can execute alternative calls in their place. For example, the network proxy can intercept encryption or compression calls made by the application and can perform more secure encryption or enhanced compression in their place.

III. Example System for Implementing Network Proxies

A more detailed example system for implementing the features of the network proxy 110 will now be described. The example system is described in the context of a server-based computing environment that provides client systems with access to shared resources. The shared resources can be virtual desktops implemented as virtual machines, WINDOWS Terminal Server sessions, blade computers (such as blade PCs), combinations of the same, or the like. However, while network proxy features are described in the context of the shared resources system, the network proxy can be implemented with other systems that do not include virtual desktops, Terminal Servers, blade PCs, or other shared resources.

Figure 3:
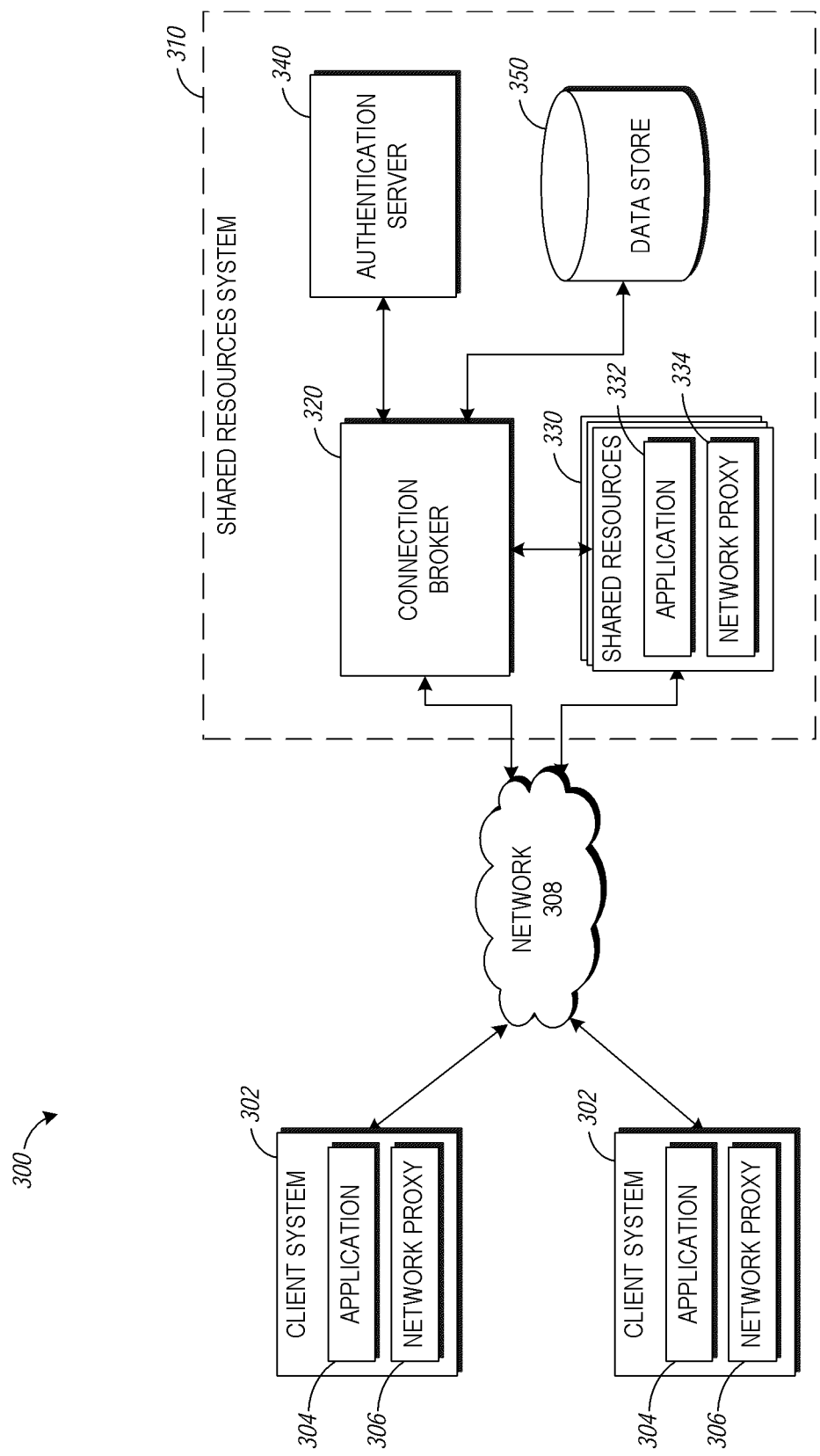
FIG. 3 illustrates an embodiment of a network environment for providing access to a shared resources system.

Accordingly, FIG. 3 illustrates an embodiment of a network environment 300 for providing access to a shared resources system 310. The shared resources system 310 can provide access for users of client systems 302 to shared computing resources 330. The client systems 302 access the shared resources system 310 using an application process 304. The application process 304 can implement an application layer protocol such as RDP. In other embodiments, the application process 304 can interface with an application layer protocol such as RDP, rather than implementing the protocol. A corresponding application process 332 is implemented by the shared resources 330 for communicating with the application process 304 of the client system 302. The client systems 302 and the shared resources 330 each include a network proxy 306, 334 that can manage multiple parallel network connections between the application processes 304, 332.

The shared resources system 310 can be implemented by one or more physical computing devices, such as servers. These computing devices can be distributed geographically or can be co-located. The client systems 302 can include, for example, desktop computers, workstations, personal digital assistants (PDAs), mobile phones, other wireless handheld devices, laptop computers, tablets, and the like.

The client systems 302 can further include various software applications for accessing the shared resources system 310, such as browser software applications, stand-alone software applications, plug-ins, interfaces, combinations of the same, and the like. The client systems 302 can access the shared resources system 310 over a network 308, which can include a local or wide area network (LAN or WAN), such as an organization's intranet, the Internet, combinations of the same, and the like.

In the depicted embodiment, the shared resources system 310 includes a broker server 320, the shared resources 330 described above, an authentication server 340, and a data store 350. Each of these components can be implemented in software and/or hardware. For example, in one embodiment, the broker server 320 represents a physical computing device. In another embodiment, the broker server 320 represents a software service executing on a physical computing device. Although the various components of the shared resources system 310 are illustrated separately, some or all of them can be implemented together in one or more of the same computing devices.

The client systems 302 can communicate with the broker server 320 to obtain access to the shared resources 330. The broker server 320 can perform load balancing by allocating shared resources 330 to client systems 302 in a manner that reduces the load on any given shared resource 330. The broker server 320 can also provide authentication services for the client systems 302 to authenticate to the shared resources 330. The broker server 320 can communicate with the authentication server 340, which may include user directory information and/or authentication services, to authenticate the client systems 302. In certain embodiments, the broker server 320 can also implement certain features of the broker described in U.S. patent application Ser. No. 12/078,174, filed Mar. 27, 2008, titled "System for Provisioning, Allocating, and Managing Virtual and Physical Desktop Computers in a Network Computing Environment," (the "'174 application") the disclosure of which is hereby incorporated by reference in its entirety.

The shared resources 330 can be implemented using any of the features described in the '174 application referred to above. Further, in embodiments where the shared resources 330 include virtual desktops, the shared resources 330 can include virtual machines implemented on a hypervisor. The hypervisor can allow multiple virtual desktops having possibly different operating systems to run on a host computer at the same time.

For instance, the hypervisor can include a thin piece of software that runs directly on top of a hardware platform of a host computer and that virtualizes resources of the computer (e.g., a native or "bare-metal" hypervisor). In such embodiments, the virtual desktops can run, with their respective operating systems, on the hypervisor without the need for a host operating system. In other embodiments, the virtual desktops can have a hosted architecture in which the hypervisor runs within a host operating system environment. In such embodiments, the hypervisor can rely on the host operating system for device support and/or physical resource management. Each virtual desktop can include a guest operating system and associated applications. The virtual desktop can access the resources (e.g., privileged resources) of the host computer through the hypervisor.

As described above, each of the client systems 302 and the shared resources 330 include a network proxy 306, 334 that enables multiple parallel network connections to be made between the client system 302 and the shared resource 330. More particularly, the network proxy 306, 334 can manage parallel network connections between application processes 304, 332 on the client system 302 and shared resource 330. The application processes 304, 332 are examples of the applications 120, 122 described above with respect to FIG. 1. The network proxies 306, 334 can have all the functionality of the network proxies 110a, 110b described above with respect to FIG. 1.

Figure 4A:
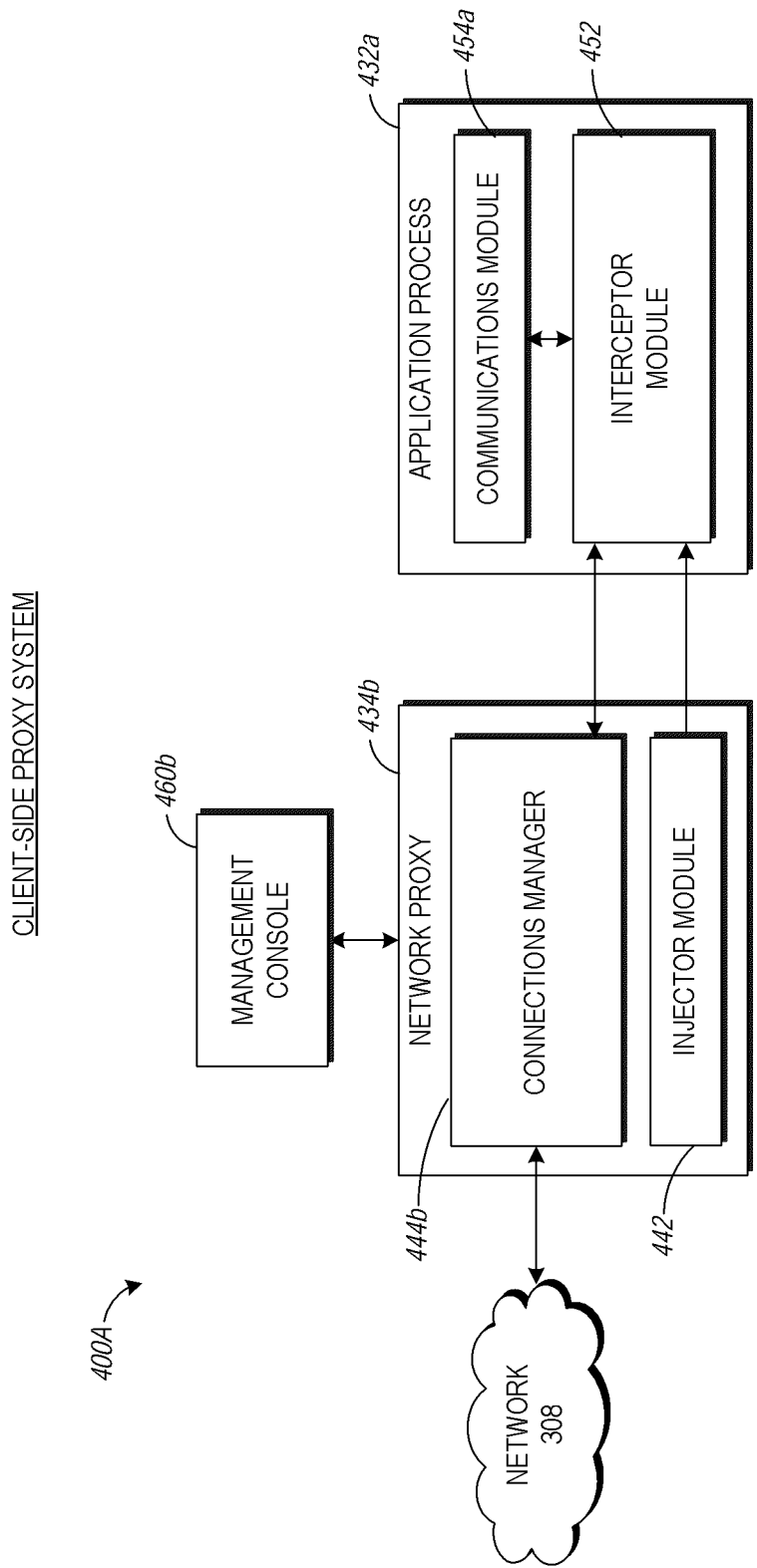
FIG. 4A illustrates an embodiment of a client-side proxy system.
Figure 4B:
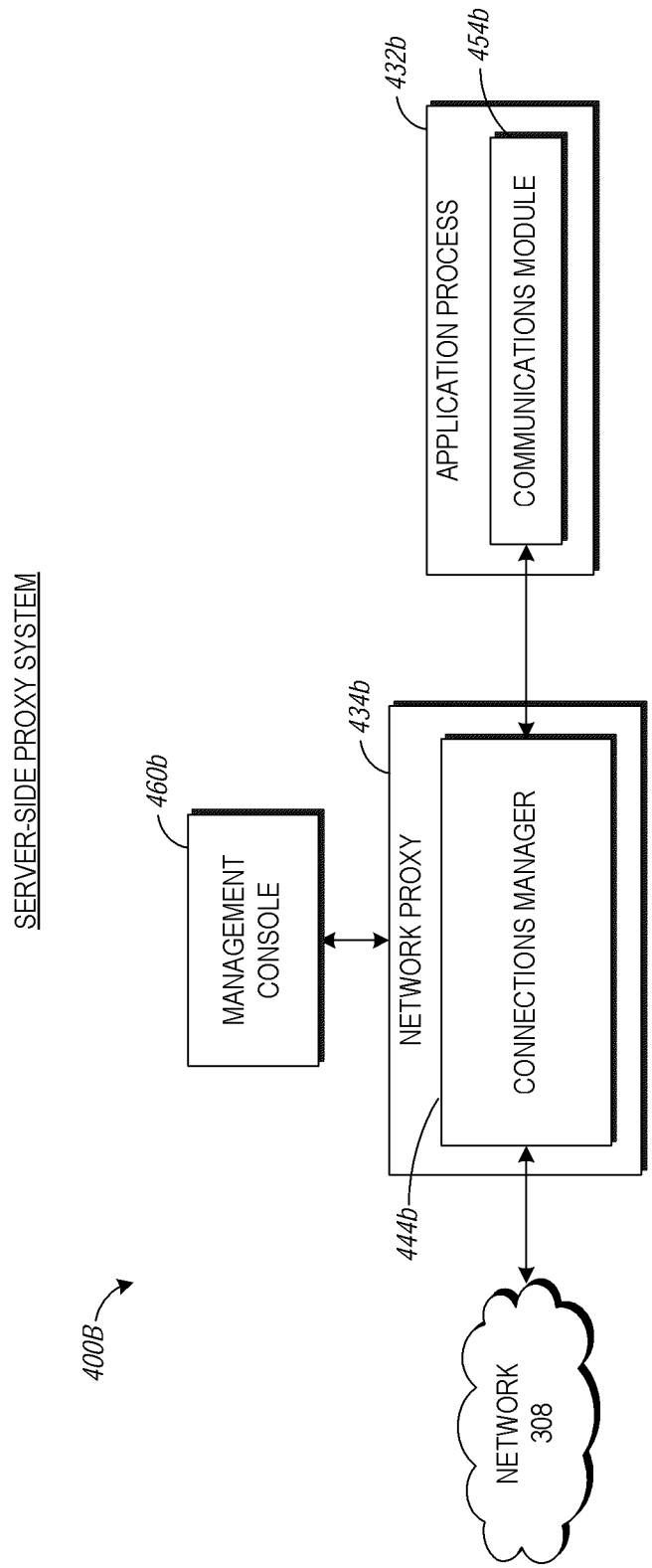
FIG. 4B illustrates an embodiment of a server-side proxy system.

More detailed examples of a network proxy and an application process are illustrated from a client-side perspective in FIG. 4A and from a server-side perspective in FIG. 4B. Referring to FIG. 4A, a client-side proxy system 400A is shown that includes a more detailed version of portions of the shared resources system 310 of FIG. 3. The network proxy system 400A includes a network proxy 434a in communication with an application process 432a. The example network proxy 434a shown includes an injector module 442 and a connections manager 444a. A management console 460a is also provided to enable customization of network proxy 434a features. Example features of the management console 460a are described below with respect to FIG. 12.

The network proxy 434a can be implemented by the client system 302 described above with respect to FIG. 3. Similarly, the application process 432a can be implemented in the client system 302. The network proxy 434a can intercept connection requests made by the application process 432a. The network proxy 434a can open multiple connections to a remote host and send messages from the application process 432a over the multiple connections. Although not discussed in detail below, it should be understood that sending data over logical network connections (such as TCP connections) can also include receiving packets, such as acknowledgement packets.

In the depicted embodiment, the network proxy 434a implements the monitoring library features described above with respect to FIG. 2 to intercept communication requests from the application process 432a. In particular, an interceptor module 452 is shown as an example of a monitoring library that can monitor connection request calls made by the application process 432a, trap these calls, and issue new calls in their place. It should be understood that in other embodiments, the network proxy 434b can implement a replacement library or filter library for intercepting communication requests from the application process 432a, or any combination of such libraries.

To prepare the network proxy 434a to manage the opening of parallel network streams, in one embodiment the injector module 442 injects a monitoring library into the address space of the application process 432a. The injector module 442 thereby forces the process 432a to run the injected monitoring library. In the depicted embodiment, the injector module 442 injects the interceptor module 452 or monitoring library into the application process 432a. The interceptor module 452 can include a library of routines, such as a shared library or DLL, which can perform various functions. Advantageously, the interceptor module 452 can alter the operation of the application process' 432a network communications without altering the source code of the application process 432a.

The interceptor module 452 can include one or more routines for trapping or intercepting networking function calls made by a communications module 454a of the application process 432a. The intercepted function calls can include calls to a socket API that attempt to create a TCP connection, for instance. Upon intercepting a socket connection call, the interceptor module 452 can run alternative routines in place of the original calls to redirect the connection to the connection manager 444a of the network proxy 434a. As an alternative to intercepting function calls, the interceptor module 452 can include one or more routines that modify one or more network request properties of the application process 432a. Modifying these properties can include changing an intended destination property of a message to refer to a different IP address and port (e.g., a TCP port).

In one embodiment, the interceptor module 452 redirects the attempted socket connection to the localhost, or the same computer system (e.g., IP address 127.0.0.1), that the application process 432a is running on. The interceptor module 452 can also specify a port number assigned to the connections manager 444a, to which the redirected connection will connect. Over this localhost socket connection, the connections manager 444a can receive data for transmission from the interceptor module 452. With communications redirected to the connections manager 444a, the connections manager 444a can open a plurality of socket connections to a remote network proxy on another remote host. The connections manager 444a can then distribute the data intercepted by the interceptor module 452 over these connections, thereby transmitting the data over the network 308. In other embodiments, some or all of the functionality of the connections manager 444a can be implemented directly by the interceptor module 452a.

Referring to FIG. 4B, a network proxy 434b is shown that can be implemented in a receiving host system that receives data over parallel network connections from the network proxy 434a of FIG. 4A. A connections manager 444b of the network proxy 434b can listen for connections on a port typically used by an application process 432b to thereby intercept connections intended for the application process 432b. For example, RDP typically listens on port 3389. The connections manager 444b can modify RDP settings (e.g., in the WINDOWS registry) to have RDP listen on a different port (such as 3390). The connections manager 444b can then listen on port 3389 in RDP's place, receive and reassemble parallelized data, and forward the data to RDP's new port (3390).

This mode of operation can be considered a pass-through mode, since the connections manager 444b listens on the application process's 432b native port and passes communications through to the application process 432b. In an alternative mode, the connections manager 444b listens on any available port of a host (such as 3390), receives and reassembles the parallelized data, and forwards the data to the native port of the application process 432b (such as 3389). The mode used to receive data with the network proxy can be user-configurable through a management console 460b (see FIG. 12).

If the port number of the application process 432b is unknown, techniques described below with respect to FIG. 5B or 5C can be used by the sending system to inform the receiving system of the application process's 432b port number. Further, in alternative implementations, the connections manager 444b can use forms of inter-process communication other than TCP/IP based communication to provide the reassembled data to the application process 432b.

IV. Network Proxy Processes

Example sending and receiving features of the network proxy 434 will now be described in greater detail with respect to processes illustrated in FIGS. 5A through 9. The processes described with respect to FIGS. 5A through 9 may be implemented by any of the systems or network proxies described herein, including the systems 100, 310, and 400A, 400B and the network proxies 120, 122, 306, 334, and 434.

Figure 5A:
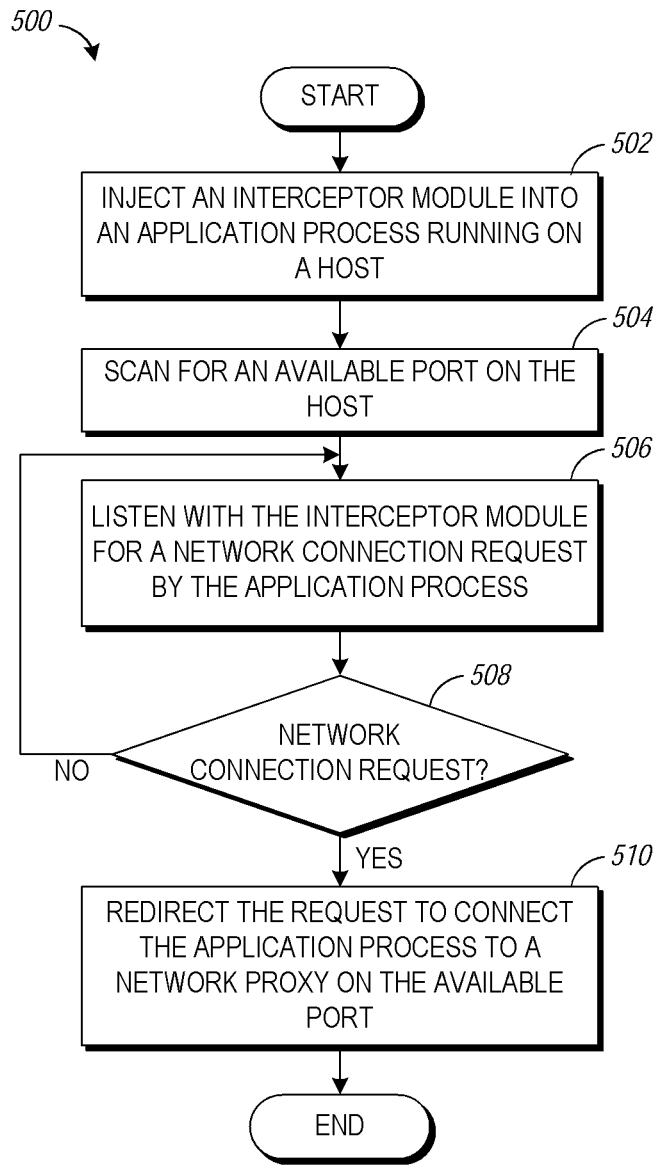
FIG. 5A illustrates a more detailed embodiment of a connection interception process.

Referring to FIG. 5A, an embodiment of a connection interceptor process 500 is shown. The connection interceptor process 500 intercepts single network connection requests from an application process and redirects the requests to a network proxy. The connection interceptor process 500 is described from the point of view of a sending host, which may be a client or server.

At block 502, an interceptor module is injected into an application process running on a host. The interceptor module may be injected by the injector module 442 described above. As described above, the interceptor module can include a library of one or more program routines. Referring again to FIG. 4, the injector module 442 can inject the interceptor module 452 by creating a thread in the application process 432a that will run the interceptor module 452. The interceptor module 452 can therefore run concurrently with other threads of the application process 432a.

Any of a variety of techniques can be used by the injector module 442 to inject the interceptor module 452 into the application process 432a. Generally speaking, these techniques can be referred to as DLL injection. Some example DLL injection techniques that the injector module 442 can employ include modifying the registry of the process 432a to load the interceptor module 452 at runtime, creating a new thread in the process 432a using a function such as CreateRemoteThread (in WINDOWS), and hooking the process 432a with a function such as SetWindowsHookEx (in WINDOWS). Similar library injection techniques or other techniques can be used in operating system environments other than WINDOWS.

Referring again to FIG. 5A, an available port on the host is scanned for at block 504. This scanning can be performed by the interceptor module 452 or by another component of a network proxy. The available port can be bound to the connections manager 444a so that communications to the available port are sent to the connections manager 444a (see block 510). In one embodiment, the scanning operation of block 504 is performed once instead of each time the connection interceptor process 500 executes.

At block 506, the interceptor module listens for a network connection request by the application process. The interceptor module can listen for a particular socket API call to be made, for instance. At block 508, it is determined whether a network connection request was made by the application process. If so, at block 510, the request is redirected to connect to the network proxy on the available port instead. With the request redirected to the connections manager 444a, messages can pass from the application process to the network proxy. If no request is made, however, the process loops back to block 506, effectively continuing to listen for a connection request.

The request can be redirected in a variety of different ways. For example, the interceptor module can access properties of the request or of the application process itself. For the RDP protocol, the properties can be accessed through an ActiveX control. The interceptor module can modify a property of the request that relates to the intended destination of the request. Modifying the property can include changing the IP address of the intended destination to the localhost (e.g., 127.0.0.1) and changing the destination port to the port bound to the connections manager 444a. The interceptor module can send the intended destination information to the connections manager 444a so that the connections manager 444a will know which server and port number to access over parallel connections.

In another embodiment, the interceptor module can trap the socket API call of the application process and obtain any intended destination information from the socket API call. The interceptor module can then run a replacement socket routine in place of the socket API call, which redirects the connection request to the port bound to the connections manager 444a. The replacement socket routine can also send the intended destination information to the connections manager 444a. In another implementation, instead of using a replacement socket routine, the interceptor module can trap and modify the socket API call of the application process. This modified socket API call can include the localhost address and port number of the connections manager 444a instead of the intended destination information.

As described above with respect to FIG. 4, the destination port of some application processes may be unknown to the connections manager 444a in the receiving host. In such situations, the sending host can inform the receiving host of the destination port number, as illustrated in FIG. 5B. FIG. 5C illustrates a different approach for handling an unknown destination port.

Referring to FIG. 5B, an embodiment of a port relaying process 520 is shown. In the port relaying process 520, a target port number is identified in messages intercepted from an application process at block 522. The target port number can be identified by the connections manager 444a of the sending host's network proxy. At block 524, a message is sent to the receiving host that includes the target port number. This message can be sent by the sending host's network proxy prior to opening parallel network connections to the receiving host.

At the receiving host, the network proxy is configured to listen on the target port number at block 526. The connections manager of this network proxy can, for instance, modify the settings of the application process (e.g., in a WINDOWS registry) to listen on a different port than the target port. Then, the connections manager can bind itself to the target port. In this manner, the network proxy on the receiving host can intercept communications from the sending host on the target port.

At block 528, network connections are opened by the sending host to the target port on the receiving host. In the depicted embodiment, each of the parallel connections is opened to a single port. The connections manager on the receiving host can create a thread for each connection to the port. In alternative embodiments, the parallel connections can be opened to multiple ports instead.

FIG. 5C illustrates an embodiment of a port redirection process 530. At block 532, a target port number is identified in messages intercepted from an application process. Instead of relaying the target port number as in the process 520, however, the message is modified at block 534 to be addressed to a new port number of a network proxy on the receiving host. The new port number can be selected by an administrator in one embodiment. A plurality of network connections can be opened at block 536 to the new port number on the receiving host.

Over these connections, the sending network proxy can communicate the target port number to the receiving network proxy. Alternatively, the receiving network proxy can identify the port number of the application process from settings related to the application process, which in WINDOWS systems may be obtained from the registry. The receiving network proxy can forward reassembled messages to the application process at the target port number of the application process.

Figures 6, 7:
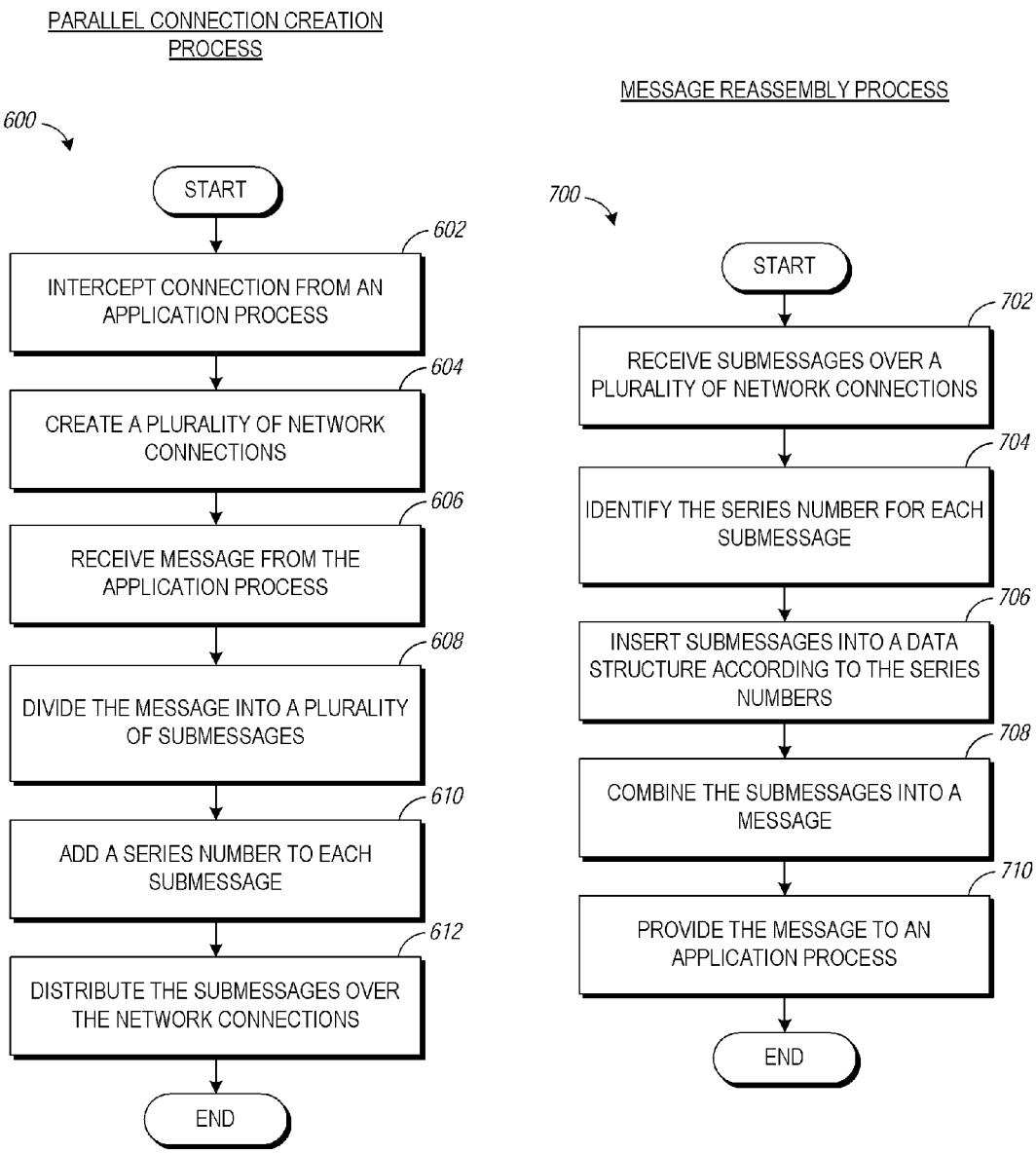
FIG. 6 illustrates an embodiment of a parallel connection creation process.
FIG. 7 illustrates an embodiment of a message reassembly process.

FIG. 6 illustrates an embodiment of a parallel connection creation process 600. The parallel connection creation process 600 illustrates one approach for distributing a message over multiple network connections. The parallel connection creation process 600 is implemented by a network proxy on a sending host. For example, the process 600 can be implemented by the connections manager 444a described above.

At block 602, a connection from an application process is intercepted, using any of the techniques described above. At block 604, a plurality of network connections are created. Each network connection can be created by opening a TCP socket, for instance. At block 606, a message is received from the application process. The message can include data to be transmitted over a network to a receiving host. The message can be streamed from the application process, such that portions of the message are provided to the network proxy at a time. Thus, the remainder of the process 600 can be performed while additional portions of the message are being received from the application process. Alternatively, the remainder of the process 600 can be performed once the entire message has been received.

The message is divided into a plurality of submessages at block 608. Each submessage can be intended for a different one of the network connections. The submessages can be of equal length or of varying length. The submessages may, but need not, have the same length as a data payload of a TCP segment.

A series number is added to each submessage at block 610. For instance, a header that includes the series number can be created for the submessage. The series number can be used to reassemble the submessages at the receiving network proxy in the proper order. The series number may be useful because submessages can arrive out of order both within an individual connection and among parallel connections. The series number can be separate from the sequence number assigned by TCP to each segment. Advantageously, in certain embodiments, using series numbers in this manner can facilitate reassembling the messages at the receiving end without modifying TCP (or any other existing protocol). In alternative implementations, however, TCP (or another protocol) can be modified to include the additional series numbers in each TCP (or other) segment.

At block 612, the submessages are distributed over the network connections.

Figure 8:
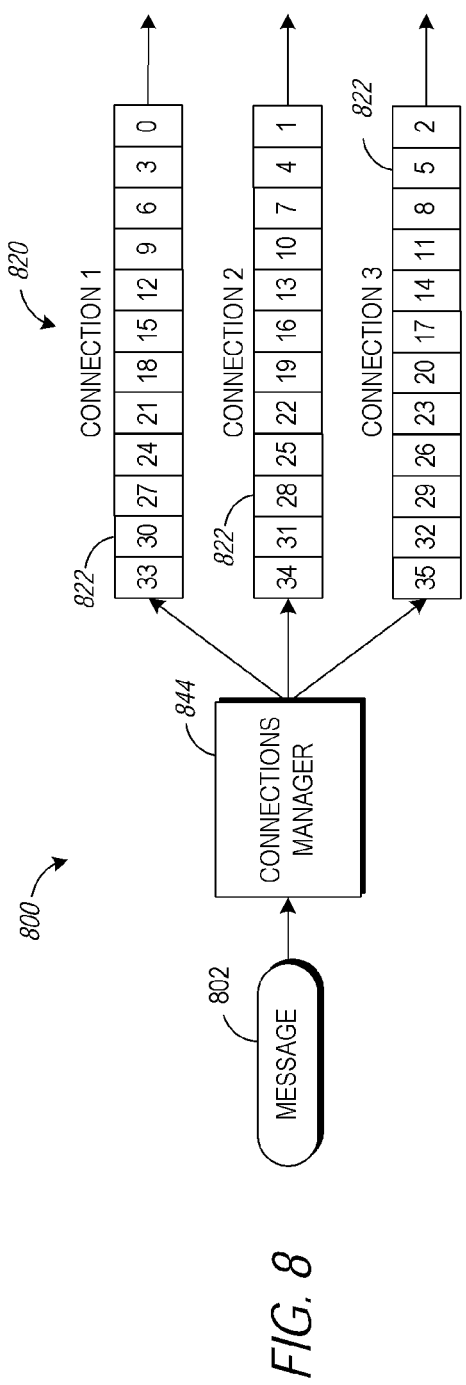
FIG. 8 illustrates an example system implementation of the process of FIG. 6.

Turning to FIG. 8, an example system 800 implementation of the parallel connection creation process 600 of FIG. 6 is shown. In the example system 800, a message 802 is received from an application process by a connections manager 844. The connections manager 844 can include all of the functionality of the connections manager 444a described above. The connections manager 844 divides the message into submessages 822 and assigns series numbers to each submessage 822. The connections manager 844 opens multiple TCP connections 820 to a remote host (see FIG. 9) and distributes the submessages 822 over the connections 820.

For illustrative purposes, three connections 820 are shown in FIG. 8. Each connection includes a plurality of submessages 822. The series number for each submessage 822 is depicted within the submessage (numbers 0 through 35). The numbers shown are merely illustrative and may differ in other embodiments. In the depicted embodiment, the connections manager 844 distributes the submessages 822 in a round-robin fashion to each connection 820. For example, the connections manager 844 can assign each successive submessage 822 to a different connection 820. Submessage 0 (the first submessage) is therefore in connection 1, submessage 1 is in connection 2, submessage 2 is in connection 3, and so on.

Instead of assigning each successive submessage 822 to a different connection 820, the connections manager 844 could instead successively assign a block of submessages 822 to each connection. For instance, the connections manager 844 could transmit submessages 0 through 3 on connection 1, submessages 4 through 7 on connection 2, and so on. In other embodiments, the connections manager 844 can use other distribution algorithms other than a round-robin algorithm to transmit data over the connections 820. The connections manager 844 can also prioritize certain types of traffic, such as multimedia traffic, to include more connections than other types of traffic. Such embodiments are described in greater detail below with respect to FIGS. 13 through 16.

FIG. 7 illustrates an embodiment of a message reassembly process 700. The message reassembly process 700 can be performed by a connections manager at a receiving host. At block 702, submessages are received over a plurality of network connections. These submessages may be received out of order due to taking different routes through a network, because of retransmission when packets are dropped, or for other reasons. Thus, at block 704, the series number for each submessage is identified. The submessages, or representations thereof (such as pointers to the submessages), are assigned to a data structure according to their series numbers at block 706. Once sufficient in-order submessages have been received, the submessages are combined into a message at block 708 and sent to an application process in block 710.

Figure 9:
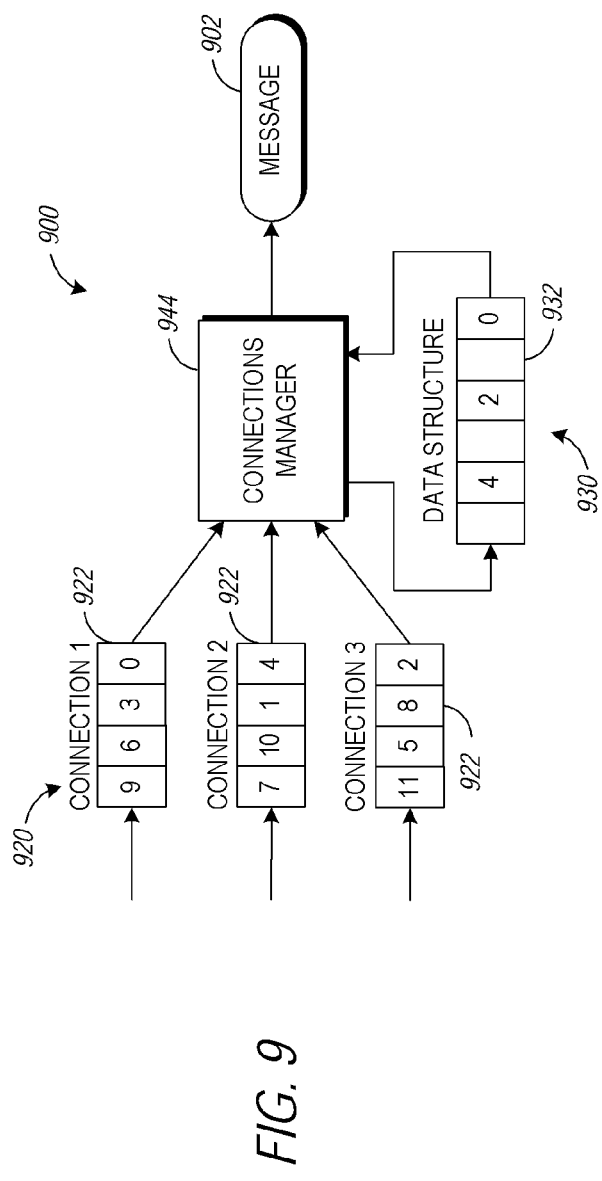
FIG. 9 illustrates an example system implementation of the process of FIG. 7.

Turning to FIG. 9, an example system 900 implementation of the message reassembly process 700 of FIG. 7 is shown. The system 900 can be implemented in a receiving host and receives the submessages sent from the system 800 of FIG. 8. With continued reference to FIG. 9, a connections manager 944 receives submessages 922 over various connections 920. Three connections 920 are shown, each corresponding to the connections 820 in FIG. 8.

As shown in FIG. 9, the submessages 922 may be received out of order, as identified by their series numbers. The connections manager 944 therefore maintains a data structure 930 such as an array or the like that holds the submessages 922 (or pointers thereto) as they arrive. As can be seen, submessages 922 0, 2, and 4 have been received in the data structure 930. Empty slots 932 in the data structure 930 indicate places where not-yet-received submessages may eventually be placed. Once a sufficient number of submessages have been received, the connections manager 944 combines the submessages into a message 902 and outputs the message 902 to an application process (not shown).

V. Congestion Control

Figure 10:
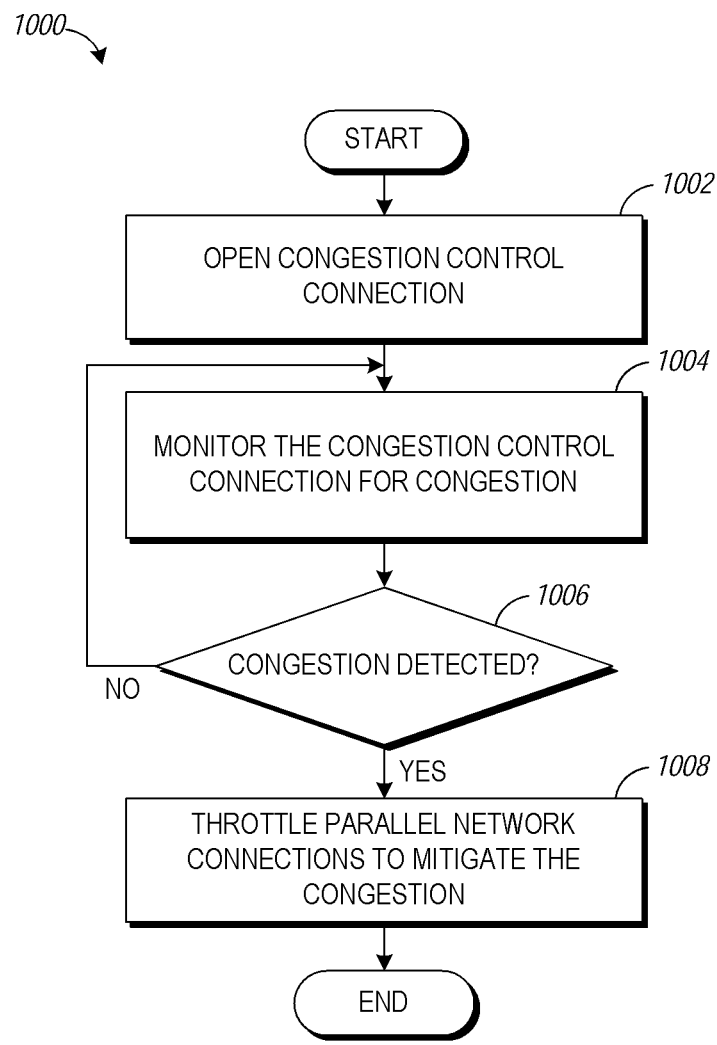
FIG. 10 illustrates an embodiment of a congestion control process.
Figure 11:
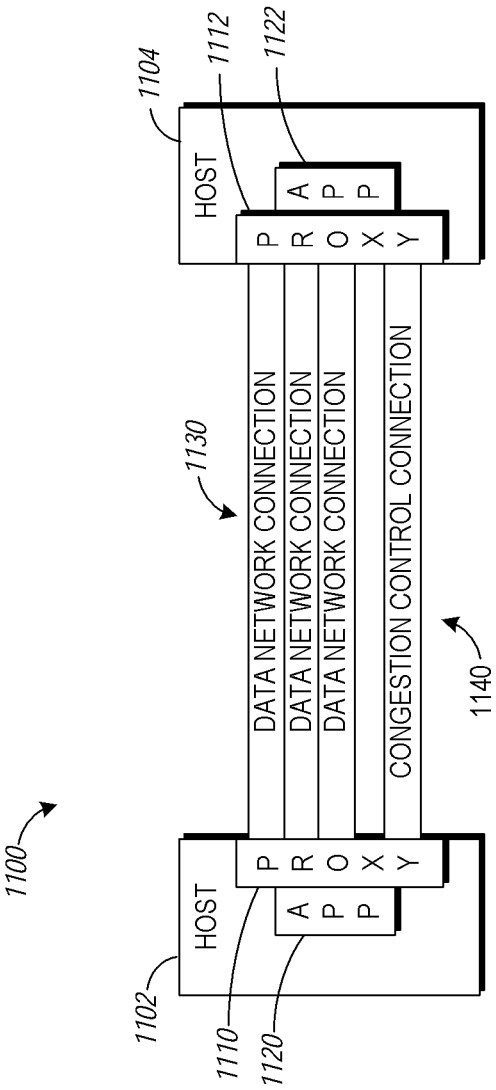
FIG. 11 illustrates an example system implementation of the process of FIG. 10.

As described above, the network proxy can increase application throughput by circumventing the congestion-control mechanism of TCP with additional connections. However, in doing so, the network proxy may cause a host to monopolize network resources. In certain embodiments, the network proxy can balance its goal of congestion avoidance with a goal of attempting to ensure fair usage of network resources. FIGS. 10 and 11 illustrate an example congestion control technique that a network proxy can perform.

FIG. 10 illustrates an embodiment of a congestion control process 1000. The congestion control process 1000 can be implemented by any of the network proxies described herein. For example, the process 1000 can be implemented by any of the connection managers described herein.

The process 1000 will also be described in the context of FIG. 11, which depicts a congestion control system 1100. In the congestion control system 1100, example hosts 1102, 1104 are shown, as in FIG. 1. Each host has an application 1120, 1122 that communicates with the other over a network through a network proxy 1110 or 1112. The network proxy 1110 opens multiple network connections 1130 to the other network proxy 1112. These connections 1130 are referred to as data network connections 1130 in FIG. 11.

Referring to FIG. 10, at block 1002, a congestion control connection is opened. An example of such a congestion control connection 1140 is shown in FIG. 11. The congestion control connection 1140 can be a separate TCP connection that does not send any application data from the application 1120 to the other application 1122. Instead, the congestion control connection 1140 can send test packets to the network proxy 1112.

Referring again to FIG. 10, at block 1004 the congestion control connection is monitored for the presence (or level) of congestion. Congestion can be detected in a variety of ways. For instance, the network proxy 1112 can send echo packets and measure their round-trip return time (RTT) to infer congestion. A higher RTT can reflect more congestion and vice versa.

It is determined at decision block 1006 whether congestion was detected. If so, the data network connections are throttled at block 1008 to mitigate the congestion. The data network connections can be throttled in a variety of ways. One way is to close one or more of the connections. Another way to throttle the connections is to reduce the TCP receive buffer size for one or more of the connections.

In alternative embodiments, a congestion control connection is not used. Instead, the connection manager monitors the data network connections to detect the presence of congestion in any of the network connections. If the connection manager detects congestion in any of the connections, the connection manager can throttle the bandwidth used by the one or more of the other connections.

VI. Customization Features

Various customization features will now be described. The network proxy can be customized by a user, such as a network administrator. In addition, the network proxy can automatically adjust its operation based on a variety of factors. User customization of the network proxy is described with respect to FIG. 12, while automatic network proxy customization is described with respect to FIGS. 13 and 14. Any of the network proxies and systems described herein can implement the features described with respect to FIGS. 12 through 14.

Figure 12:
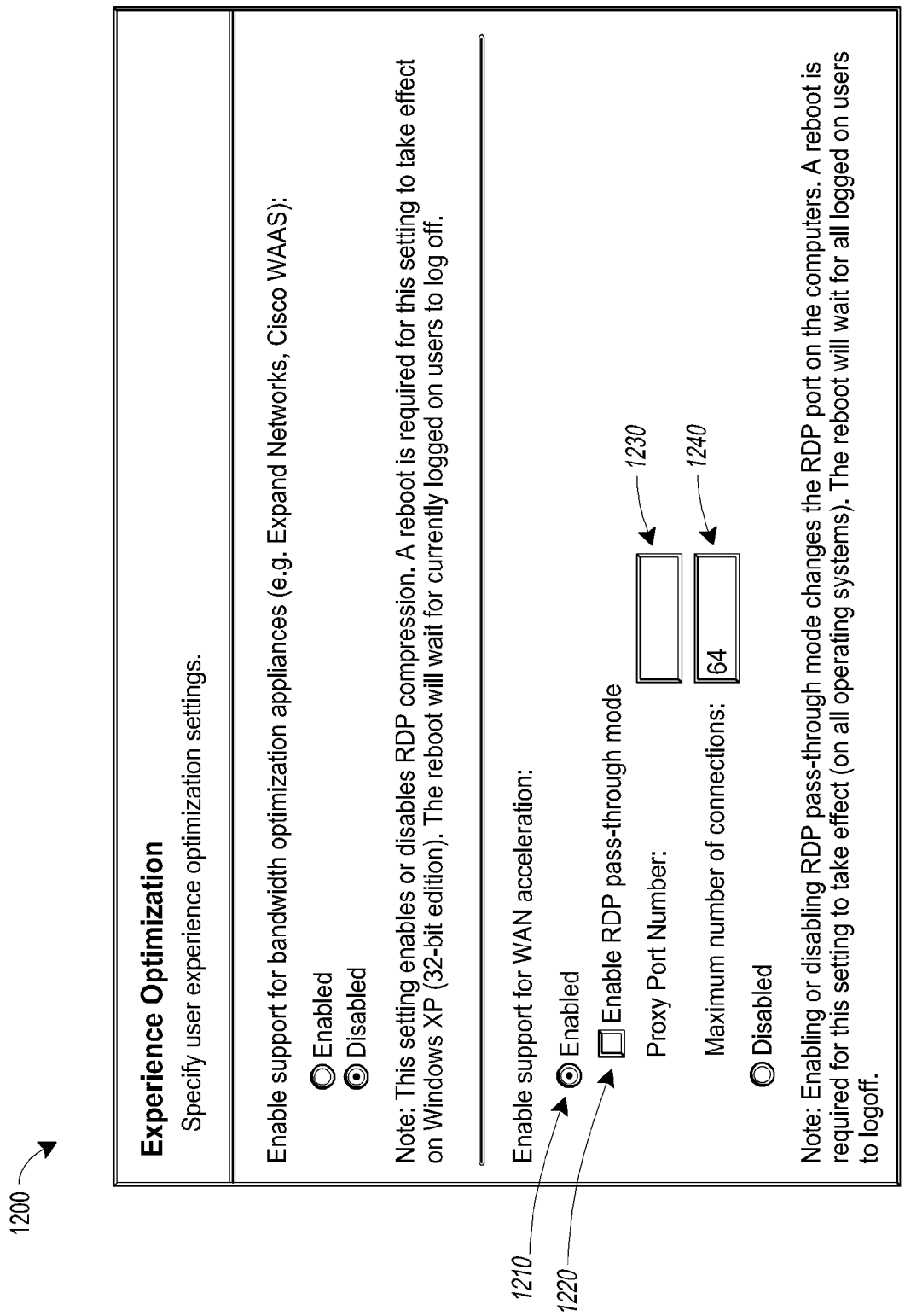
FIG. 12 illustrates an embodiment of a user interface for adjusting network proxy settings.

FIG. 12 illustrates an embodiment of a customization user interface 1200 for adjusting network proxy settings. The customization user interface 1200 can be generated by a management console, such as the management console 460 of FIG. 4. The customization user interface 1200 can also be accessed over a network by a user, for example, via a web interface or the like.

Among other features, the customization user interface 1200 includes user interface controls 1210-1240 to adjust settings of a network proxy, referred to in the FIGURE as WAN acceleration. A radio button control 1210 allows a user to enable or disable the network proxy. If the network proxy is enabled, a user can specify whether to use the network proxy in a pass-through mode using a checkbox control 1220. As described above, using the network proxy in pass-through mode can cause the network proxy to listen for incoming network connections on an application process's native port. Operating in pass-through mode can allow a user to avoid configuring a firewall to accept a new port. If a user does not wish to use the network proxy in pass-through mode, the user can instead specify a port number for the proxy to listen on in a text box control 1230.

Additionally, another text box control 1240 is provided for enabling a user to specify a maximum number of connections for a network proxy to make. The network proxy need not open the maximum connections, but instead may be limited by the maximum number of connections. The control 1240 can enable an administrator to tune the performance of the network proxy. In addition, the control 1240 can enable an administrator to enforce network policy so that a number of connections is not exceeded.

Figure 13:
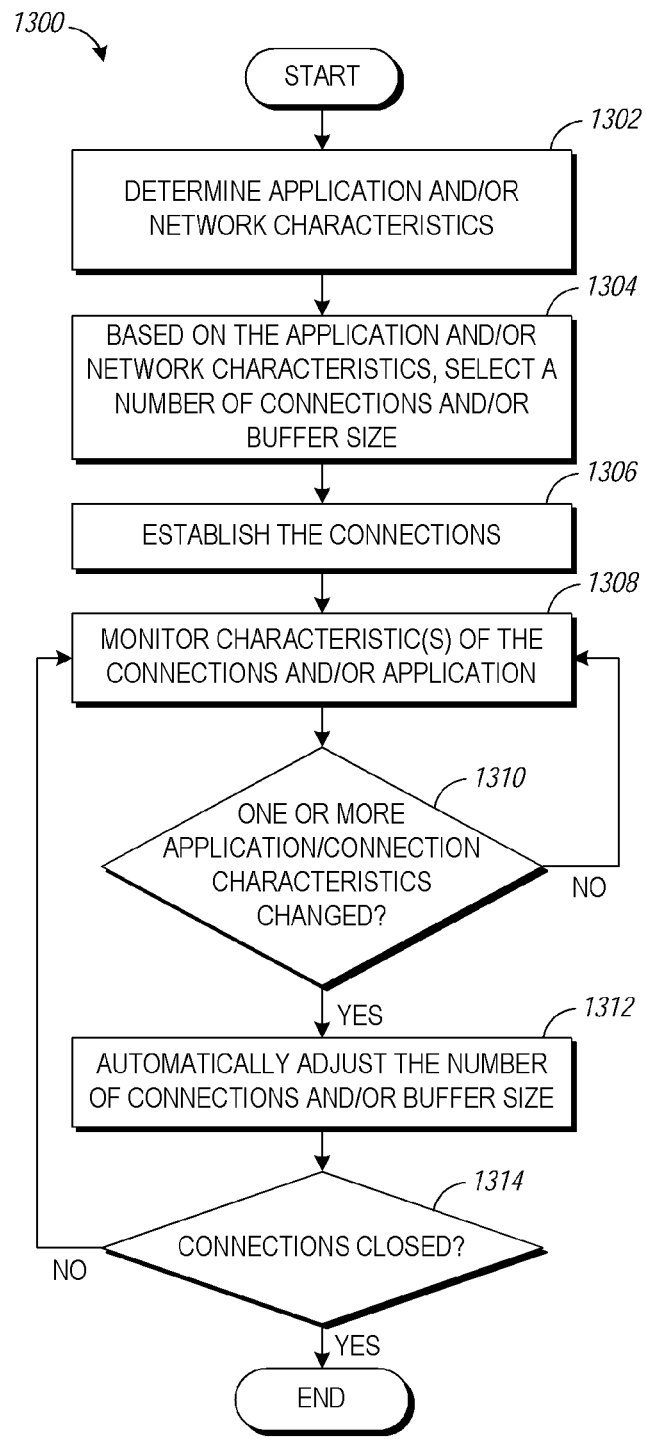
FIG. 13 illustrates an embodiment of a dynamic connection adjustment process.

FIG. 13 illustrates an embodiment of a dynamic connection adjustment process 1300. The dynamic connection adjustment process 1300 can be implemented by any of the systems or network proxies described herein. In particular, the process 1300 can be implemented by any of the connection managers described herein. Advantageously, in certain embodiments the process 1300 automatically adjusts a network proxy to improve performance.

At block 1302, one or more application characteristics and/or network characteristics are determined. Application characteristics can include the type of application that is using the network proxy, the size of a message to be communicated by the application, and so forth. Network characteristics can include available bandwidth, latency, and the like.

One example of an application that can be analyzed at block 1302 is an application implementing a native protocol, such as RDP. As described above, RDP is a protocol that can transmit graphics, audio, text, and other data associated with a virtual desktop or Terminal Server session. Many different types of computer applications can transmit data over RDP, including video streaming applications, office productivity applications, web applications, and so on. The application characteristics determined at block 1302 can include the type of application-layer protocol the application is using to communicate, such as RDP or HTTP. The application characteristics can also include what type of application is communicating over the network, such as a word processor application or a web browser application.

Some applications tend to use more bandwidth and therefore might benefit from more parallel connections. An example of such an application is a video streaming application. Other applications tend to use less bandwidth and therefore might have sufficiently good performance with fewer parallel connections. In fact, for some such applications, too many parallel connections can actually degrade performance. One type of application that might use less bandwidth is an office or productivity application, such as a word processor application. Similarly, TCP receive buffer sizes can affect performance, with bandwidth-intensive applications potentially benefiting from larger buffer sizes.

Different network characteristics or conditions can also dictate how many connections might be useful to open or how large to make the TCP buffer. With more available bandwidth, more connections can be opened to take advantage of the available bandwidth. Similarly, larger buffer sizes can be used in higher bandwidth conditions. In addition, the higher the latency present on the network, the more connections and/or higher buffer size might be desirable.

Thus, at block 1304, based on the application and/or network characteristics, a number of connections and/or buffer size are automatically selected (e.g., by the connections manager). The connections are established at block 1306. At block 1308, one or more characteristics of the connections and/or the application are monitored, such as the type of application currently using the connections (e.g., media player versus word processor), the bandwidth of the connections, their latency, and the like. Since the application being used, its bandwidth consumption, and the network can change over time, it can be desirable to adjust the number of connections and/or buffer size used.

Thus, if at decision block 1310 it is determined that one or more connection and/or application characteristics have changed, then an automatic adjustment to the number of connections or buffer size is made at block 1312. For example, if the network is experiencing higher latency, the network proxy may open additional connections to offset the effects of the latency. In another example, the network proxy can open one or more new connections if an application consumes more bandwidth (and vice versa). The network proxy can detect when an application's bandwidth usage changes, for example, by determining whether the application attempts to send a certain different type of data over the network (such as video data). The network proxy can then add more connections or close connections, as appropriate. It should be noted that instead of closing a connection based on the monitored network conditions, a network proxy can simply stop sending submessages on the connection.

If one or more connection and/or application characteristics have not changed, the process 1300 loops back to block 1308, where the monitoring continues. At decision block 1314, it is further determined whether the connections are closed. If so, the process 1300 ends. Otherwise, the process loops back to block 1308, where monitoring continues.

As another potential embodiment, the network proxy may also monitor the network characteristics of each individual connection and adjust the data sent over the connections based on these characteristics. For instance, if one connection is more congested than another, the network proxy can reduce or minimize the amount of data sent over that congested connection. The network proxy can send messages to other connections instead. Similarly, the network proxy can favor connections with more data when those connections exhibit lower latency than other connections. Moreover, while the process 1300 has been described as being implemented by a network proxy, the features of the process 1300 can also be implemented by an application that opens multiple network connections using API calls. Thus, the features of the process 1300 are not tied to network proxy features in certain embodiments. Many other variations are possible.

Figure 14:
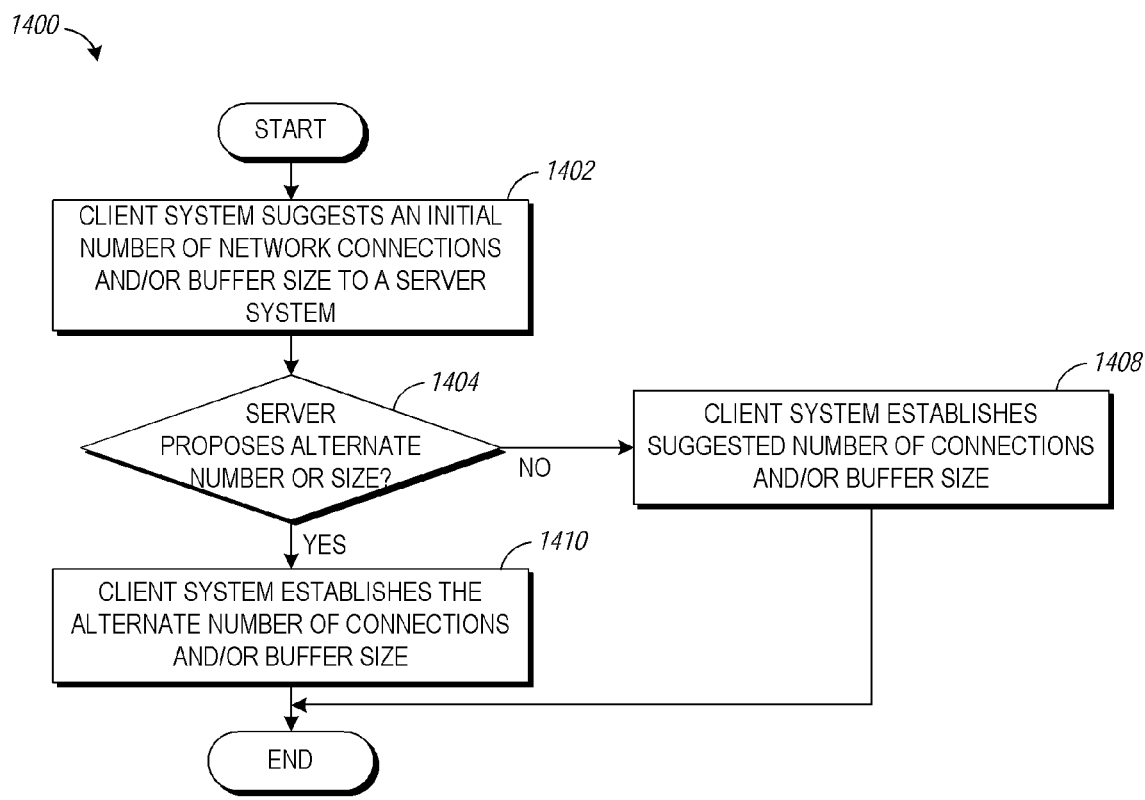
FIG. 14 illustrates an embodiment of a connection negotiation process.

FIG. 14 illustrates an embodiment of a connection negotiation process 1400. The connection negotiation process 1400 can be used in conjunction with the dynamic connection adjustment process 1300 described above with respect to FIG. 13. In particular, the connection negotiation process 1400 can be used to automatically adjust the number of connections and/or buffer size at block 1312 of the process 1300. The process 1300 is described from the point of view of a client system. However, a server system can also perform the features of the process 1300. More generally, any of the network proxies described herein can implement the process 1300.

At block 1402, a client system suggests to a server system an initial number of network connections and/or a buffer size. The suggested number of connections or buffer size can be determined based on the criteria described above with respect to FIG. 13. At decision block 1404, it is determined whether the server proposes an alternate number of connections or buffer size. The server might propose these alternate connection characteristics based on information available to the server about network conditions, application characteristics, and so forth.

If the server proposes an alternate number of connections or buffer size, the client system establishes the suggested number of connections and buffer size at block 1408. Otherwise, the client system establishes the alternate number of connections and/or buffer size at block 1410. In an alternative embodiment, the client may further suggest different connection characteristics in response to the servers' suggestion. If the server accepts the new characteristics, the client system can establish the connections using the new characteristics. Moreover, in another embodiment, the client system merely uses the server's proposed characteristics as suggestions, which the client system may or may not choose to adopt.

VII. Virtual Channel Management

Some native protocols, such as RDP, transmit data over virtual channels. Virtual channels can include certain application-specific data that is packed according to a specified format and transmitted over a single RDP/TCP connection. Some examples of virtual channels include channels that communicate data related to kernel-mode drivers such as printer drivers, file system redirection channels, channels for user-mode applications (such as remote cut-and-paste on a virtual desktop connection), and channels for audio devices (including Voice-over IP (VoIP) enabled devices).

A drawback to using virtual channels in RDP or other protocols is that granular control over virtual channels can be difficult due to the virtual channels each not being sent over dedicated actual channel or connection. Thus, for instance, an RDP connection over TCP might have multiple virtual channels, possibly intermingled with other information (such as data related to mouse or keyboard input), such that visibility into the TCP connection to distinguish the virtual channels can be difficult. Further, due to architectural limitations with RDP, the quality of service of some bandwidth-intensive virtual channels such as multimedia redirected channels, VoIP channels, and the like can be severely degraded over high-latency networks.

If visibility were feasible, it might be desirable to manipulate the virtual channels to achieve certain outcomes. For a VoIP-related virtual channel, for instance, it can be desirable to promote the bandwidth usage or bandwidth priority of the virtual channel to improve the telephony throughput and thereby increase quality of service (QoS). Similarly, it can be useful to have access to the VoIP packets so as to reduce their size or other packetization properties to promote QoS.

Figure 15:
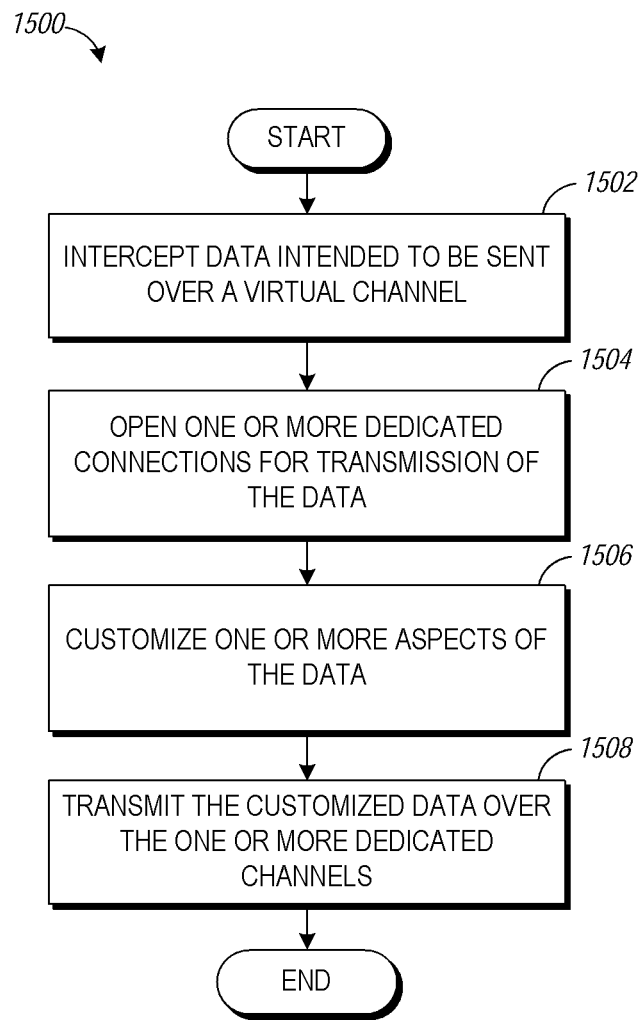
FIG. 15 illustrates an embodiment of a virtual channel redirection process.

FIG. 15 illustrates an embodiment of a virtual channel redirection process 1500. Advantageously, in certain embodiments, the process 1500 enables virtual channels provided by RDP or other applications to be more easily manipulated. The process 1500 can be implemented by any of the network proxies or connection managers described herein.

At block 1502, data intended to be sent over a virtual channel is intercepted. The data or virtual channel connection request can be intercepted using any of the interception techniques described above. At block 1504, one or more dedicated connections are opened for the transmission of the data. The one or more dedicated connections can be actual channels such as TCP channels, rather than virtual channels within a single TCP connection. Thus, a virtual channel such as a VoIP channel can be redirected over its own TCP connection or multiple TCP connections. As a result, the QoS of the VoIP connection can improve due to better bandwidth utilization.

Further, at block 1506, one or more aspects of the data are optionally customized. For example, the network proxy can include functionality for adjusting the packetization and/or priority of the TCP connection to further improve QoS. At block 1508, the customized data is transmitted over the one or more dedicated channels. It should be noted that the customization of the data can be omitted in certain embodiments.

Although not shown, in certain embodiments, certain QoS parameters can be provided for customization by the management console 460a or 460b (see FIG. 4A, 4B). These QoS parameters can allow a user to define desired network connection characteristics. Examples of QoS parameters include a maximum throughput allowed and a minimum throughput allowed. If a network proxy detects that a maximum throughput parameter is not being met, the network proxy can throttle connections by introducing latency, reducing TCP buffer sizes, closing connections, combinations of the same, or the like. Similarly, if a network proxy detects that a minimum throughput parameter is not being met, the network proxy can attempt to increase throughput by increasing TCP buffer sizes, opening new connections, or both. The QoS parameters can be used to facilitate meeting service level agreement (SLA) requirements, to attempt to meet performance goals, or for other purposes.

Figure 16:
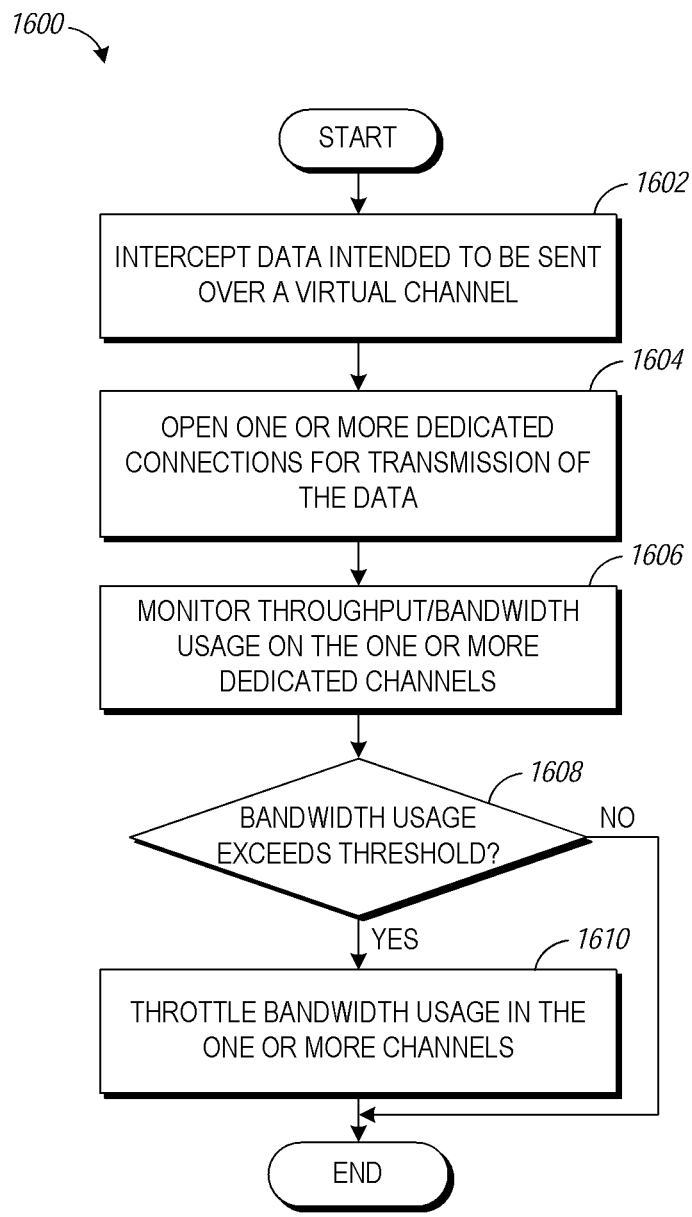
FIG. 16 illustrates an embodiment of a channel throttling process.

FIG. 16 illustrates an embodiment of a channel throttling process 1600. The channel throttling process 1600 can be used to isolate bandwidth-intensive virtual channels for the purpose of controlling the bandwidth usage of those channels. Controlling the bandwidth of a channel can be useful to prevent certain users from monopolizing bandwidth. The process 1600 can likewise be implemented by any of the network proxies or connection managers described herein.

At block 1602, data intended to be sent over a virtual channel is intercepted as above (see FIG. 15). In addition, as in the process 1500, one or more dedicated connections are opened for the transmission of the data at block 1604 (see FIG. 15). Throughput or bandwidth usage is monitored on the one or more dedicated channels at block 1606. Throughput can be monitored, for example, by determining an amount of data sent during a given time period. Throughput can be sampled, e.g., every second, and may be calculated using a running average to smooth out variations while giving greater weight to more recent throughput values.

It is determined at decision block 1608 whether the bandwidth usage exceeds a threshold. If it does, then at block 1610, the bandwidth usage is throttled. The bandwidth usage can be throttled by adjusting the one or more connections and/or buffer sizes using any of the techniques described above with respect to FIG. 13. In addition, the bandwidth usage may be throttled by introducing latency or delays into one or more of the connections. The process 1600 can continue monitoring the bandwidth usage until the one or more connections are closed.

VIII. Alternative Implementations

It should be noted that certain of the features described herein, such as the features described above with respect to FIGS. 10 through 16, can be implemented without using a network proxy that intercepts connection requests. Instead, in certain embodiments, these features can be implemented by making multiple calls to socket API routines to open parallel connections. Thus, for instance, dynamic connection management can be performed by a network component that uses API calls to open multiple network connections. This network component can monitor application and/or network usage and adjust the number of open connections accordingly via additional socket API calls.

IX. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multithreaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of managing a plurality of network connections, the method comprising:
   by a network proxy implemented on a first host system comprising computer hardware:
   intercepting a network connection request from an application running on the first host system, the network connection request intended to open a single logical network connection to a second host system;
   in response to intercepting the network connection request, opening a plurality of parallel logical network connections to the second host system instead of the single logical network connection;
   establishing a congestion control connection with the second host system, wherein the network proxy implemented on the first host system is configured to send test packets to a remote network proxy implemented on the second host system;
   receiving a message from the application;
   monitoring, by at least one of the network proxy and the remote network proxy, the congestion control connection to determine a level of congestion; and
   transmitting the message to the second host system over the plurality of parallel logical network connections.

2. The method of claim 1, wherein said intercepting the connection request comprises causing the application to connect to a port bound to the network proxy.

3. The method of claim 1, further comprising throttling one or more of the plurality of parallel logical network connections in response to detecting the network congestion.

4. The method of claim 3, wherein said throttling comprises closing one or more of the plurality of parallel logical network connections.

5. The method of claim 1, wherein said intercepting the connection request comprises injecting a library into the application, the library comprising one or more routines configured to perform said intercepting.

6. The method of claim 1, wherein said intercepting the connection request comprises registering a library with an operating system of the first host system, the library comprising one or more routines configured to perform said intercepting.

7. The method of claim 1, wherein said intercepting the connection request comprises replacing a library used by the application, the library comprising one or more routines configured to perform said intercepting.

8. A system for managing a plurality of network connections, the system comprising:
   a hardware appliance on a host computer system, the hardware appliance having a network proxy implement therein, the network proxy comprising:

an interceptor module configured to intercept a connection request from an application process attempting to open a single logical connection from the application process to a remote host system;

a connections manager configured to:
- establish parallel logical connections to the remote host system in place of the single logical connection;
- establish a congestion control connection with the remote host system, wherein the network proxy implemented on the host computer system is configured to send test packets to a remote network proxy implemented on the remote host system;
- receiving a message from the application process;
- monitor, by at least one of the network proxy and the remote network proxy, the congestion control connection to determine a level of congestion; and
- distribute a message to the remote host system over the parallel logical connections.

9. The system of claim 8, wherein an injector module is configured to use a library injection technique to inject the interceptor module into the application process.

10. The system of claim 8, wherein the connections manager is configured to distribute the message over the parallel logical connections using a round-robin algorithm.

11. The system of claim 8, wherein the application process is an application layer process, and wherein the network proxy is interposed between the application layer process and a transport layer process.

12. The system of claim 8, further comprising identifying a target port number associated with the connection request.

13. The system of claim 12, further comprising sending a message including the target port number to the remote host system, such that the remote host system is configured to receive the message at the target port number.

14. The system of claim 8, further comprising modifying the connection request to include a new port number of a network proxy on the remote host system.

15. The system of claim 8, wherein the network connections are Transmission Control Protocol (TCP) connections.

16. A system for managing a plurality of network connections, the system comprising:
a hardware appliance on a client computer system, the hardware appliance having a client network proxy implemented therein, the client network proxy comprising:
- an injector module configured to inject an interceptor module into an application process executing on the client computer system;
- the interceptor module configured to intercept a connection request from the application process, the connection request intended to open a single Transmission Control Protocol (TCP) connection to a remote host system;
- a connections manager configured to:
  - establish parallel TCP connections to a server network proxy implemented in the remote host system in place of the single TCP connection, the parallel TCP connections being abstracted from the application process;
  - establish a congestion control connection with the remote host system, wherein the client network proxy implemented on the client computer system is configured to send test packets to the server network proxy implemented in the remote host system;
  - receiving a message from the application process;
  - monitor, by at least one of the client network proxy and the server network proxy, the congestion control connection to determine a level of congestion; and
  - distribute a message received from the application process over the parallel TCP connections to the server network proxy.

17. The system of claim 16, wherein the connections manager is further configured to throttle one or more of the parallel TCP connections in response to detecting the network congestion.

18. A non-transitory computer-readable storage medium comprising computer-executable instructions configured to implement a method of managing a plurality of network connections, the method comprising:
- intercepting, with a network proxy running on a first host system, a network connection request from an application running on the first host system
- in response to intercepting the network connection request, opening a plurality of logical network connections to a second host system;
- establishing a congestion control connection with the second host system, wherein the network proxy implemented on the first host system is configured to send test packets to a remote network proxy implemented on the second host system;
- receiving a message from the application;
- monitoring, by at least one of the network proxy and the remote network proxy, the congestion control connection to determine a level of congestion; and
- transmitting the message to the second host system over the plurality of logical network connections.

19. The non-transitory computer-readable storage medium of claim 18, wherein said intercepting the connection request comprises injecting a library into the application, the library comprising one or more routines configured to perform said intercepting.

20. The non-transitory computer-readable storage medium of claim 18, wherein said intercepting the connection request comprises registering a library with an operating system of the first host system, the library comprising one or more routines configured to perform said intercepting.

21. The non-transitory computer-readable storage medium of claim 18, wherein said intercepting the connection request comprises replacing a library used by the application, the library comprising one or more routines configured to perform said intercepting.

22. The non-transitory computer-readable storage medium of claim 18, wherein the network connection request is configured to request a User Datagram Protocol (UDP) connection, and wherein said opening the plurality of logical network connections comprises opening Transmission Control Protocol (TCP) connections instead of the requested UDP connection.

* * * * *